(12) United States Patent
Yamada

(10) Patent No.: US 11,860,111 B2
(45) Date of Patent: Jan. 2, 2024

(54) IMAGE RECONSTRUCTION METHOD FOR X-RAY MEASURING DEVICE, STRUCTURE MANUFACTURING METHOD, IMAGE RECONSTRUCTION PROGRAM FOR X-RAY MEASURING DEVICE, AND X-RAY MEASURING DEVICE

(71) Applicant: NIKON CORPORATION, Tokyo (JP)

(72) Inventor: Atsushi Yamada, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 526 days.

(21) Appl. No.: 16/879,389

(22) Filed: May 20, 2020

(65) Prior Publication Data

US 2020/0284735 A1 Sep. 10, 2020

Related U.S. Application Data

(63) Continuation of application No. 15/549,010, filed as application No. PCT/JP2015/053518 on Feb. 9, 2015, now abandoned.

(51) Int. Cl.
*G01N 23/04* (2018.01)
*G01N 23/044* (2018.01)

(52) U.S. Cl.
CPC ........... *G01N 23/044* (2018.02); *G01N 23/04* (2013.01); *G01N 2223/401* (2013.01)

(58) Field of Classification Search
CPC . G01N 23/044; G01N 23/04; G01N 2223/401
See application file for complete search history.

(56) References Cited

U.S. PATENT DOCUMENTS

| | | | |
|---|---|---|---|
| 4,852,131 | A | 7/1989 | Armistead |
| 5,436,829 | A | 7/1995 | Hartley |
| 2007/0217565 | A1 | 9/2007 | Ein-Gal |
| 2010/0098209 | A1 | 4/2010 | Forthmann et al. |
| 2013/0026391 | A1 | 1/2013 | Sekino et al. |

FOREIGN PATENT DOCUMENTS

| | | |
|---|---|---|
| JP | 2009-122043 | 6/2009 |
| JP | 2013-217775 | 10/2013 |
| JP | 2013-217797 | 10/2013 |
| WO | WO 2014/010421 A1 | 1/2014 |

(Continued)

OTHER PUBLICATIONS

English-language International Search Report from the Japanese Patent Office for PCT/JP2015/053518, dated Apr. 7, 2015.

(Continued)

*Primary Examiner* — Mark R Gaworecki
(74) *Attorney, Agent, or Firm* — FINNEGAN, HENDERSON FARABOW, GARRETT & DUNNER, LLP

(57) ABSTRACT

An image reconstruction method, includes: generating differential data indicating a difference between detection data generated by detecting X-ray that passed through a measurement object by irradiating X-rays to the measurement object and estimate data generated by estimating X-rays that are assumed to have been passed through an estimated structure having been generated by estimating a shape of the measurement object; and generating an image using the differential data and the estimated structure.

21 Claims, 9 Drawing Sheets

(56) References Cited

FOREIGN PATENT DOCUMENTS

WO  WO-2014010421 A1 * 1/2014  ............. G01N 23/04

OTHER PUBLICATIONS

First Office Action issued by the State Intellectual Property Office in China dated Sep. 2, 2019 in counterpart Chinese Application No. 201580069160.4, and English translation thereof.
English Translation of WO 2014/010421, Umehara, Yasutoshi, pub. Jan. 16, 2014. (Year: 2014).
English Translation of JP 2013-217797, Shiga, Masatake, pub. Oct. 24, 2013. (Year: 2013).
Office Action issued by the Japanese Patent Office dated Dec. 25, 2018 in counterpart Japanese Application No. 2016-574538, and English translation thereof.
Extended European Search Report issued by the European Patent Office dated Sep. 17, 2018 in corresponding Application No. 15881910.2.

* cited by examiner

FIG.4
(a)
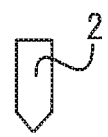
(b)
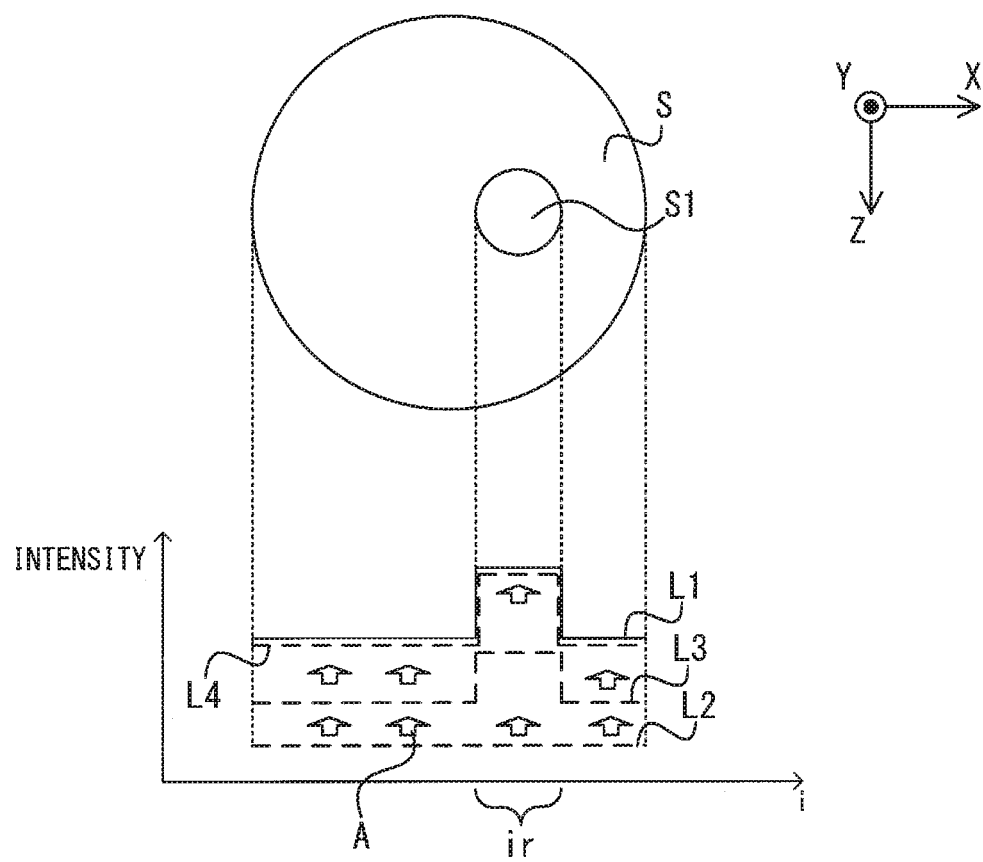

IMAGE RECONSTRUCTION METHOD FOR X-RAY MEASURING DEVICE, STRUCTURE MANUFACTURING METHOD, IMAGE RECONSTRUCTION PROGRAM FOR X-RAY MEASURING DEVICE, AND X-RAY MEASURING DEVICE

CROSS-REFERENCE TO RELATED PATENT APPLICATIONS

This application is a continuation of U.S. patent application Ser. No. 15/549,010, filed Aug. 4, 2017, which is a National Stage Entry of International Application No. PCT/JP2015/053518, filed Feb. 9, 2015. The entire contents of the above-referenced applications are expressly incorporated herein by reference.

TECHNICAL FIELD

The present invention relates to an image reconstruction method for an X-ray measuring device, a structure manufacturing method, an image reconstruction program for an X-ray measuring device, and an X-ray measuring device.

BACKGROUND ART

As a device that acquires information about the inside of an object non-destructively, for instance, an X-ray device that irradiates an X-ray to an object and detects the X-ray that has passed through the object is known. This X-ray device has an X-ray source from which an X-ray is irradiated and detects the X-ray that has passed through the object to enable observation of the inside thereof (cf., PTL 1). In this manner, the information about the inside of the object is acquired.

CITATION LIST

Patent Literature

PTL 1: US Patent Application Laid-open No. 2010/0098209 A1

SUMMARY OF INVENTION

Technical Problem

However, the image acquired by the X-ray device as described above may contain an artifact due to the X-rays irradiated to the object. As a result, the accuracy of inspection may be decreased. According to an aspect, an object of the present invention is to provide an image reconstruction method for an X-ray measuring device, a structure manufacturing method, an image reconstruction program for an X-ray measuring device, and an X-ray measuring device, which can prevent a decrease in the accuracy of inspection.

Solution to Problem

According to the first aspect of the present invention, an image reconstruction method for an X-ray measuring device comprises: causing a measurement object to be irradiated with X-rays from multiple different irradiation directions by rotating the measurement object and/or changing the irradiation directions of the X-rays, detecting X-rays that passed through the measurement object in each of the multiple different irradiation directions, and generating multiple sets of detection data relating to the intensity of the X-rays that passed through the measurement object; estimating the intensity of the X-rays that are assumed to have been passed through an estimated structure, whose shape has been estimated based on shape information about the measurement object, in each of the multiple different irradiation directions if the estimated structure is assumed to be irradiated with the X-rays from the multiple different irradiation directions, and generating multiple sets of estimated data; and, extracting differential data indicating a difference between the estimated data and the detection data from the detection data using, for each of the multiple sets of detection data, the detection data and the estimated data mutually corresponding with respect to the irradiation directions of the X-rays.

According to the second aspect of the present invention, an image reconstruction method for an X-ray measuring device, comprises: causing a measurement object to be irradiated with X-rays from multiple different irradiation directions by rotating the measurement object and/or changing the irradiation directions of the X-rays, detecting X-rays that have been passed through the measurement object in each of the multiple different irradiation directions, and generating multiple sets of detection data relating to the intensity of the X-rays passed through the measurement object; estimating the intensity of the X-rays that are assumed to be passed through an estimated structure in each of the multiple different irradiation directions of the X-rays if the X-rays are assumed to be irradiated to the estimated structure of which a shape has been estimated based on shape information of the measurement object along each of the multiple different irradiation directions, and generating a plurality of estimated data; extracting differential data indicating a difference between the estimated data and the detection data from the detection data using, for each of the multiple sets of detection data, the detection data and the estimated data mutually corresponding with respect to the irradiation directions of the X-rays; and, determining, when the difference indicated by the extracted difference data does not exceed a predetermined value, that the measurement object is a conforming product.

According to the third aspect of the present invention, a structure manufacturing method, comprises: generating design information relating to the shape of a structure; forming the structure based on the design information; measuring the shape of the formed structure by performing the image reconstruction method for an X-ray measuring device according to any one of the aspects described above to acquire shape information; and comparing the acquired shape information with the design information.

According to the fourth aspect of the present invention, an image reconstruction program for an X-ray measuring device, which program causes a computer to execute processes, comprises: a detection data generation process for causing a measurement object to be irradiated with X-rays from multiple different irradiation directions by rotating the measurement object and/or changing the irradiation directions of the X-rays, detecting X-rays that have been passed through the measurement object in each of the multiple different irradiation directions, and generating multiple sets of detection data relating to the intensity of the X-rays passed through the measurement object: an estimated data generation process for estimating the intensity of the X-rays that are assumed to be passed through an estimated structure, whose shape has been estimated based on shape information about the measurement object, in each of the multiple different irradiation directions if the estimated structure is assumed to be irradiated with the X-rays from the multiple different irradiation directions, and generating multiple sets of estimated data; and an extraction process for extracting of differential data indicating a difference between the estimated data and the detection data from the detection data using, for each of the multiple sets of detection data, the detection data and the estimated data mutually corresponding with respect to the irradiation directions of the X-rays.

According to the fifth aspect of the present invention, an X-ray measuring device comprises: an acquisition unit that acquires multiple sets of detection data relating to the intensity of an X-rays passed through a measurement object, the detection data being generated by causing the measurement object to be irradiated with X-rays from multiple different irradiation directions by rotating the measurement object and/or changing the irradiation directions of the X-rays, and detecting X-rays that have been passed through the measurement object in each of the multiple different irradiation directions; and an image generation unit that estimates the intensity of the X-rays that are assumed to be passed through an estimated structure, whose shape has been estimated based on shape information about the measurement object, in each of the multiple different irradiation directions if the estimated structure is assumed to be irradiated with the X-rays from the multiple different irradiation directions, and generates multiple sets of estimated data and extracting differential data indicating a difference between the estimated data and the detection data from the detection data using, for each of the multiple sets of detection data, the detection data and the estimated data mutually corresponding with respect to the irradiation directions of the X-rays.

BRIEF DESCRIPTION OF DRAWINGS

FIG. 4 is a diagram schematically showing a concept of correcting the shape of an estimated structure;

DESCRIPTION OF EMBODIMENTS

First Embodiment

Figure 1:
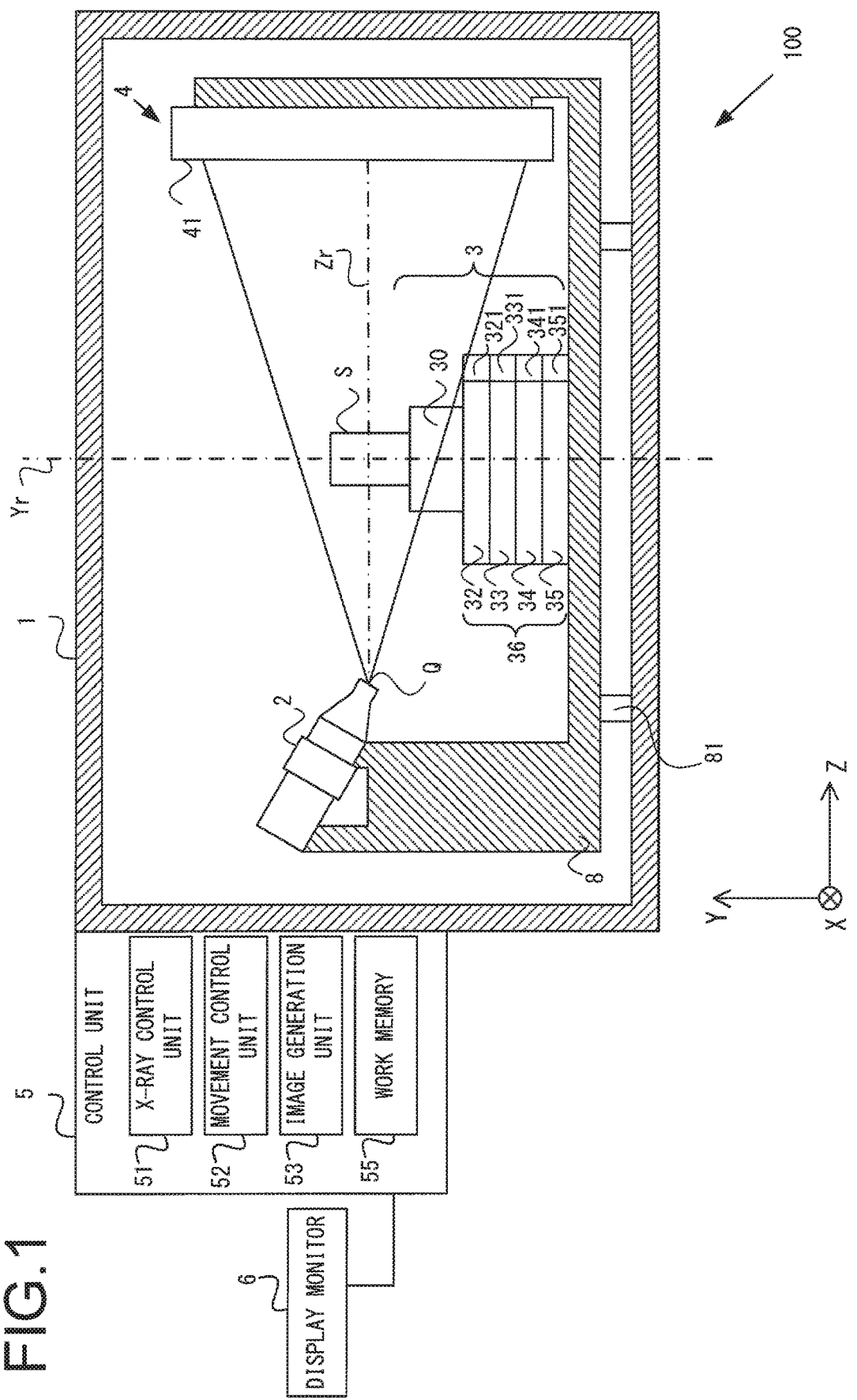
FIG. 1 is a diagram explaining the configuration of an X-ray device according to an embodiment of the present invention.

Referring to the drawings, an X-ray device according to the first embodiment of the present invention will be explained. The X-ray device irradiates an X-rays to a measurement object and detects the X-rays that passed through the measurement object to acquire information about the inside (for instance, inside structure) of the measurement object or the like non-destructively. In case where the target of measurement, i.e., the measurement object is a part for industrial use, for instance, a machine part or an electronic component, the X-ray device is called an industrial X-ray CT (Computed Tomography) inspection device that inspects the part for industrial use. Note that the inspection target of the measurement object may be an animate being such as a human body, an animal, a plant, etc. Also, the target may be one of tissues of a living organism. Also, the target may be a combination of an animate being and a non-living material such as a part for industrial use. The present embodiment is presented in order to concretely explain the gist of the present invention and unless indicated specifically, it does not limit the present invention.

FIG. 1 is a diagram showing an example of the configuration of an X-ray device 100 according to the present embodiment. Note that for convenience of explanation, a coordinate system consisting of an X-axis, a Y-axis and a Z-axis is set as shown in FIG. 1. The X-ray device 100 includes a housing 1, an X-ray source 2, a mounting unit 3, a detector 4, a control unit 5, a display monitor 6, and a frame 8. The housing 1 is disposed on a floor surface of factory or the like so as to be substantially parallel (horizontal) to an XZ-plane and in the inside thereof are housed the X-ray source 2, the mounting unit 3, the detector 4, and the frame 8. To prevent the X-rays from leaking to the outside, the housing 1 is made of a material that contains lead.

The X-ray source 2 radiates X-rays extending along an optical axis Zr that is parallel to the Z axis, spreading in the form of a cone (so-called cone beam) toward the positive direction of the Z axis with an output point Q shown in FIG. 1 being at the top of the cone. The output point Q corresponds to a focal spot of the X-ray source 2. That is, the optical axis Zr connects the output point Q, which is the focal spot of the X-ray source 2, with the center of an imaging area of the detector 4 described later. Note that the X-ray source 2 that radiates X-rays in a fan-like form (so-called fan beam) and one that radiates X-rays in a form of a line (so-called pencil beam) instead of one that emits X-rays in a cone form are also included as the aspects of the present invention. The X-ray source 2 can radiate at least one of, for instance, an ultrasoft X-ray of about 50 eV, a soft X-ray of about 0.1 to 2 keV, an X-ray of about 2 to 20 keV, and a hard X-ray of about 20 to 100 keV. Furthermore, the X-ray source 2 may radiate an X-ray of, for instance, 1 to 10 Mev.

The mounting unit 3 includes a mount stage 30 on which a measurement object S is mounted and a manipulator unit 36 that includes a rotary drive unit 32, a Y-axis movement unit 33, an X-axis movement unit 34 and a Z-axis movement unit 35 and is provided on the positive (+) side along the Z-axis relative to the X-ray source 2. The mount stage 30 is provided rotatable by the rotary drive unit 32 and moves together with the manipulator unit 36 when the manipulator unit 36 moves in the direction along the X axis, Y axis, and Z axis respectively.

The rotary drive unit 32 is structured so as to include, for instance, an electric motor that rotates the mount stage 30 by rotative force generated by the electric motor being driven under control of the control unit 5 as described later such that the mount stage 30 rotates about an axis that is parallel to the Y-axis and that passes the center of the mount stage 30 as a rotation axis Yr. That is, the rotary drive unit 32 changes relative direction of the mount stage 30 and the measurement object S thereon, with respect to the X-rays radiated from the X-ray source 2 by rotating the mount stage 30. The Y-axis movement unit 33, the X-axis movement unit 34, and the Z-axis movement unit 35, under control by the control unit 5, move the mount stage 30 along the X-axis direction, along the Y-axis direction, and along the Z-axis direction, respectively, so that the measurement object S can be positioned within the area in which the X-rays outputted from the X-ray source 2 is irradiated. The Z-axis movement unit 35, under control by the control unit 5, moves the mount stage 30 along the Z-axis direction to a position at which the distance of the measurement object S from the X-ray source 2 is a distance such that a projection image of the measurement object S has a desired magnification ratio.

A Y position detector 331, an X position detector 341, and a Z position detector 351 are encoders that detect the positional movements of the mount stage 30 along the X-axis direction, along the Y-axis direction, and along the Z-axis direction, respectively, by the Y-axis movement unit 33, the X-axis movement unit 34, and the Z-axis movement unit 35, respectively, and output signals that indicate the detected position (hereafter, referred to as detected positional movements) to the control unit 5. The rotational position detector 321 is an encoder that detects the rotational position of the mount stage 30 that is rotated about the rotation axis Yr by the rotary drive unit 32 and outputs a signal that indicates the detected rotational position (hereafter, referred to as detected rotational position) to the control unit 5. That is, the detected rotational position indicates a relative direction of the measurement object S on the mount stage 30 with respect to the X-rays radiated from the X-ray source 2.

The detector 4 is provided on the positive (+) side of Z-axis relative to the X-ray source 2 and the mount stage 30. That is, the mount stage 30 is provided between the X-ray source 2 and the detector 4 along the Z-axis direction. The detector 4 has an incident surface 41 that is parallel to the XY-plane. At the incident surface 41 enter the X-rays which include the X-rays that have been irradiated from the X-ray source 2 and passed through the measurement object S mounted on the mount stage 30. The detector 4 is constituted by a scintillator unit that contains a scintillation material that is known in the art, a photomultiplier tube, a light receiving unit, and so on. The detector 4 converts energy of the X-rays incident to the incident surface 41 of the scintillator unit into light energy of visible light or ultraviolet light, amplifies the light energy with the photomultiplier tube, converts the amplified light energy into electric energy with the light receiving unit, and outputs the electric energy as electric signals to the control unit 5. In the detector 4, the scintillator unit, the photomultiplier tube and the light receiving unit are respectively have structures in which divided into a plurality of pixels. These pixels are arranged in a two-dimensional array. Due to this, it is possible to obtain, at one time, the intensity distribution of the X-rays that has passed through the measurement object S after radiating from the X-ray source 2.

Note that the detector 4 may be one that converts the energy of the incident X-rays into electric energy and then outputs the converted electric energy in the form of electric signal without converting the energy of the incident X rays into light energy. The detector 4 is not limited to one in which the pixels are arranged in a two-dimensional array. The detector 4 has an incident surface 41 that extends on a plane parallel to the XY-plane, for instance, extends to the X direction. However, the incident surface 41 may be constituted by a line sensor that includes each of pixels disposed one after another in the Y direction. The direction along which the pixels of the line sensor are disposed is not limited to the Y direction but they may be arranged in the X direction or in the Z direction. The detector 4 may have a structure in which no photomultiplier tube is provided and the scintillator unit is directly formed on the light receiving unit (photoelectric conversion unit).

The frame 8 supports the X-ray source 2, the mounting unit 3, and the detector 4. The frame 8 is produced to have sufficient rigidity. Due to this, it is possible to stably support the X-ray source 2, the mounting unit 3, and the detector 4 while a projection image of the measurement object S is being acquired. The frame 8 is supported by a vibration isolation mechanism 81 to prevent transmitting the vibration that is generated in the outside to the frame 8 directly without being attenuated.

The control unit 5, which includes a microprocessor and its peripheral circuits and so on, reads in a control program that is stored in advance in a storage medium (for instance, a flash memory or the like) (not shown) and executes the program to thereby control each of units of the X-ray device 100. The control unit 5 includes an X-ray control unit 51, a movement control unit 52, an image generation unit 53, and a work memory 55. The X-ray control unit 51 controls the operation of the X-ray source 2. The movement control unit 52 controls the movement operation of the manipulator unit 36. The image generation unit 53 performs image reconstruction processing based on electric signals that are outputted from the detector 4 in correspondence to the intensity distribution of the X-rays that passed through the measurement object S at every predetermined angle as the measurement object S is being rotated according to the rotation of the mount stage 30 to generate a three-dimensional image of the measurement object S. The image generation unit 53 performs, as the image reconstruction processing, processing of generating X-ray projection image data (detection data) of the measurement object S based on the electric signals outputted from the detector 4, and processing a three-dimensional image showing an inside structure (cross-section structure) of the measurement object S by generating a back projection image based on the X-ray projection image data of the measurement object S under the different directions of projection, that is, different detected rotational positions. Examples of the processing of generating a back projection image include a back projection method, a filtered back projection method, a successive approximation method, and so on. The work memory 55 is constituted by, for instance, a volatile storage medium, at which the X-ray projection image data generated by the image generation unit 53 is temporarily stored.

Hereafter, the processing of generating a three-dimensional image of the measurement object S performed by the image generation unit 53 will be explained in detail. The following explanation will be done in separate parts, one on a concept of generating a three-dimensional image according to the present embodiment and another on the processing performed by the image generation unit 53 based on this concept.

Concept of Generating a Three-Dimensional Image

Figure 2:
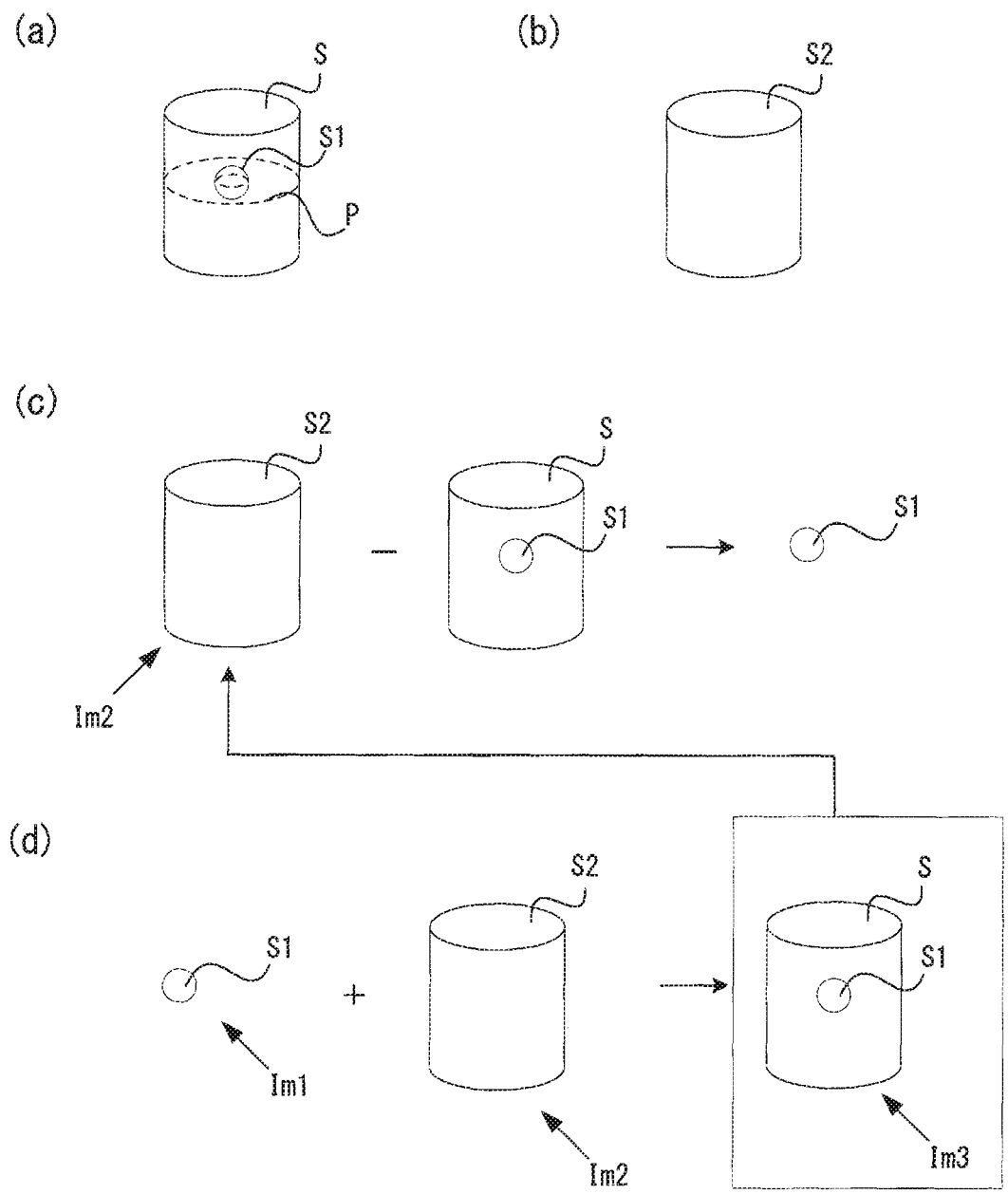
FIG. 2 is a diagram schematically showing a concept for generating a three-dimensional image.
Figure 3:
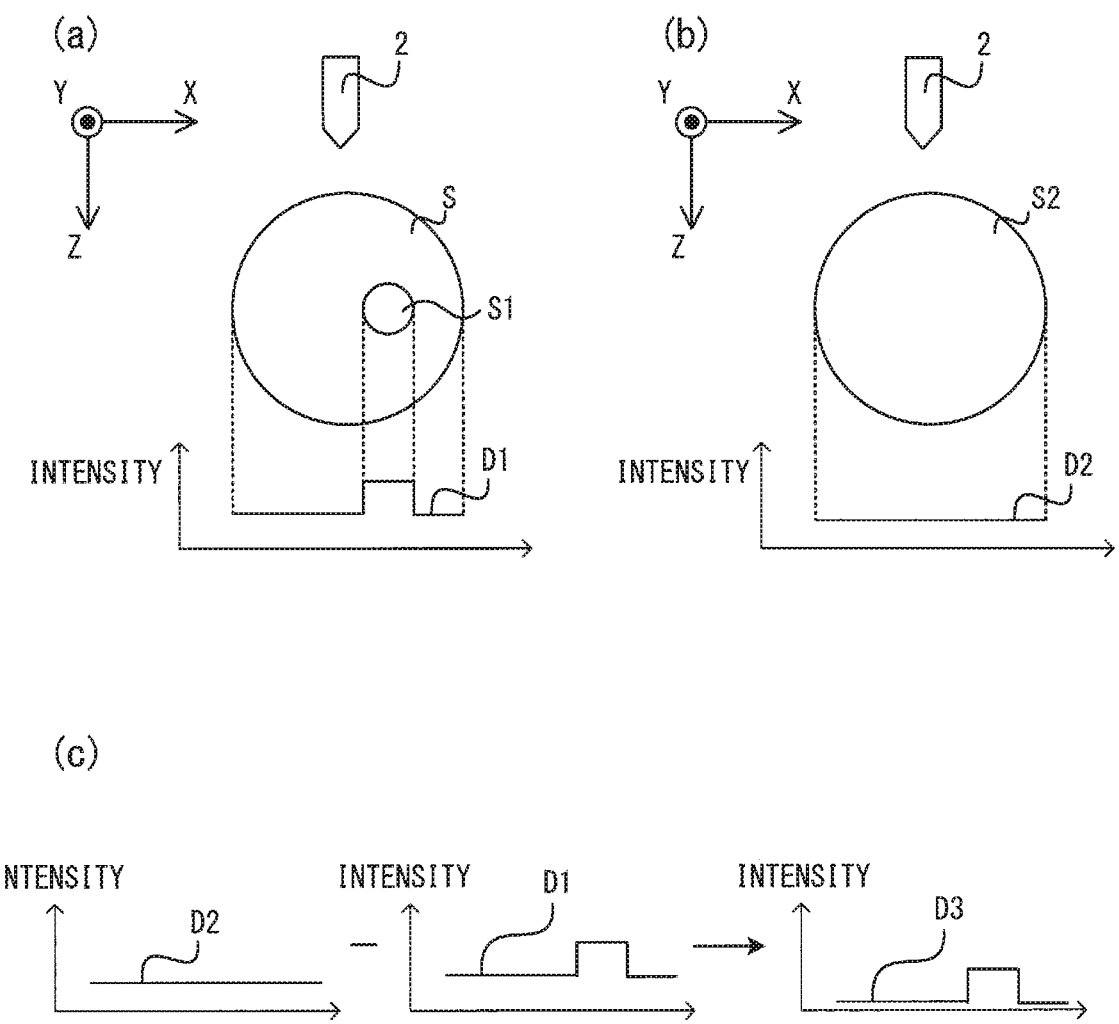
FIG. 3 is a diagram schematically showing a concept for generating a three-dimensional image using various types of data.

Referring to FIG. 2 and FIG. 3, the concept of generating a three-dimensional image will be explained. FIG. 2 is a conceptual diagram schematically showing the processing of generating a three-dimensional image according to the present embodiment. FIG. 2 (*a*) schematically shows a stereoimage of the measurement object S generated based on the detection data, which is generated based on the electric signals outputted from the detector 4. The stereoimage of the measurement object S can be obtained using plurality of sets of detection data which are obtained based on the X-rays that passed through the measurement object S by irradiation the X-rays from different directions as the mount stage is rotating. The stereoimage of the measurement object S is based on the transmission intensity distribution of the X-rays that passed through the measurement object S. Accordingly, if the measurement object S contains any defect, such as a cavity in the inside thereof, the stereoimage of the measurement object S contains information about the defect such as a cavity in the inside thereof. As a result, an error between the measurement object S and the predetermined design information, so that the stereoimage of the measurement object S occurs. FIG. 2 (a) shows a stereoimage of a detect S1 in the inside of the measurement object S as an example of the error. FIG. 3 (a) schematically shows the transmission intensity of X-ray that is used for generating the stereoimage of the measurement object S, that is, a specified single set of detection data D1 among plurality of sets of detection data. FIG. 3 (a) shows the transmission intensity of the X-ray at a cross-sectional surface (a plane P indicated in broken line in FIG. 2 (a)) that passes through the defect S1 in the inside of the measurement object S when the mount stage 30 is in one of a moved and rotated position for detection. To simplify the explanation, the intensity in the vertical axis of FIG. 3 (a) shows values calculated by dividing the transmission intensity of the X-ray by the transmission length (distance) of the X-ray. The same is true for FIG. 3 (b) and FIG. 3 (c). Since the detect S1 and the measurement object S have different absorption coefficients of an X-ray therebetween, there occurs a difference between the transmission intensity of the X-ray that passed through the defect S1 and the intensity of the X-ray that did not passed through the defect S1. FIG. 3 (a) shows an example in which the transmission intensity of the X-ray that passed through the defect S1 is higher than the intensity of the X-ray that did not passed through the measurement object S, because a ratio of X-ray absorbed at the defect S1 is smaller than the ratio of X-ray absorbed at the surrounding of the defect S1.

FIG. 2 (b) schematically shows a stereoimage of an imaginary estimated structure S2 that is based on a shape information such as CAD or the like as design information and a material information of the measurement object S. The stereoimage of the estimated structure S2 corresponds to an ideal state in which the measurement object S is manufactured according to the design values. Therefore, the estimated structure S2 does not contain the defect S1. FIG. 3 (b) schematically shows the transmission intensity of the X-ray which is estimated to be detected if the X-rays passes through the estimated structure S2, that is, estimated data D2. The estimated data D2 is an information about the intensity of the X-ray that is assumed to be passed through the estimated structure S2 that is acquired by simulation for the case in which the X-rays are irradiated to the estimated structure S2, which corresponds to that the measurement object S is manufactured according to design values (in an ideal state). Since the estimated structure S2 does not contain the defect S1, the transmission intensity of the X-ray which is estimated to be passed through the estimated structure S2 is influenced only by the absorption coefficient of the estimated structure S2 as shown in FIG. 3 (b). Note that the estimated data D2 is generated under the same condition as the condition under which the detection data D1 is obtained. That is, the estimated data D2 is generated on the presumption that X-rays are irradiated to the estimated structure S2 at the moved and rotated position for detection of the mount stage 30 as that are the same as the moved and rotated position for detection of the mount stage 30 when the detection data D1 is generated. Moreover, the estimated data D2 is generated on the presumption that X-rays are irradiated to the estimated structure S2 at an output that is the same as the output of the X-rays that are outputted from the X-ray source 2 when the detection data D1 is generated. Therefore, each of the estimated data D2 corresponds to each of the detection data D1, that are detected for respective different irradiation directions of the X-ray according to the measurement object S.

Then, as shown in FIG. 2 (c), a difference between the stereoimage of the measurement object S and the stereoimage of the estimated structure S2 is extracted. In FIG. 2 (c), the detect S1, which is the difference between the measurement object S and the estimated structure S2, is extracted. In this case, as shown in FIG. 3 (c), the differential data D3, which is the difference between the detection data D1 and the estimated data D2, is calculated. Note that, the differential data D3 in FIG. 3 (c) indicates an absolute value of intensity. The differential data D3 contains the defect S1, such as the cavity, or the like, inside the measurement object S and an error in shape between the measurement object S and the estimated structure S2. The differential data D3 is obtained by extracting the difference between each of the detection data D1 and each of the estimated data D2, which are in correspondence to each other. Therefore, each of the differential data D3 that correspond to the detection data D1, respectively, detected for respective irradiation directions of the X-ray according to the measurement object S.

As shown in FIG. 2 (d), the extracted stereoimage of the defect S1 and the extracted stereoimage of the estimated stricture S2 are combined with each other. As mentioned above, the stereoimage of the estimated structure S2 corresponds to the shape manufactured according to the design values and to the ideal state that does not contain any defect or the like. As a result, a stereoimage, which is a combination of the stereoimage of the estimated structure S2 in which generation of artifacts is prevented with the defect S1 that is extracted from the stereoimage of the measurement object S. That is, the stereoimage of the defect S1 and the stereoimage that has substantially the same shape as the measurement object S and of which generation off artifacts is prevented or reduced are generated. In this case, plurality of calculated differential data D3 are subjected to back projection to generate a back projection image Im1 relative to the difference between the measurement object S and the estimated structure S2. Then, the back projection image Im1 and an image Im2 that corresponds to the estimated structure S2 are combined with each other to generate an image Im3. That is, the image Im3 is a three-dimensional image in which the defect or the like that is present inside the actual measurement object S is reproduced in the image Im2 of the estimated structure S2, which has substantially the same shape as the measurement object S and of which generation of artifacts is prevented or reduced. Therefore, in the image Im3, generation of artifacts by beam hardening is prevented or reduced.

Note that although, for instance, in the image Im1 or the image Im3, generation of artifacts by beam hardening is prevented ore reduced, sometimes there may be demanded further precision in its size, shape, for example, in case of a spherical shape, position such as position of the center of the spherical shape. Accordingly, the estimated data D2 is calculated as supposing that the image obtained as the image Im3 is treated as the image of the estimated structure S2. Based on the calculated estimated data D2 and the detection data D1, differential data D3 is extracted. Using the extracted differential data D3, the stereoimage of the defect S1 is generated. By combining the thus-generated stereoimage of the defect S1 with the image that is once obtained as the image Im3, a new image Im3 is generated. In this manner, by performing again the step of FIG. 2 (c), the generation of artifacts by beam hardening in the secondly obtained image Im3 is more prevented or reduced than in the firstly obtained image Im3. This is because the difference between the estimated data D2 of the estimated structure S2 and the detection data D1 becomes smaller. Note that by repeatedly using the image Im3 obtained in the step of FIG. 2 (c) as the estimated structure S2 in this manner, the influence of beam hardening can be prevented or reduced. The step of repetition is not limited to once but the step may be repeated a plurality of times. The number of times of repetition may be determined based on the differential data D3 that is extracted. Note that in case a line sensor is used as the detector 4, back projection may be performed using X-ray intensity data groups in correspondence to different positions of the measurement object S along the Y direction to generate a three-dimensional image showing the inside structure of the overall measurement object S.

Processing by the Image Generation Unit 53

The processing that is performed by the image generation unit 53 for generating the above-mentioned three-dimensional image Im3 will be explained. The image generation unit 53 generates the estimated data D2 using the expressions (1) and (1)' and extracts the differential data D3 from the detection data D1 based on the output from the detector 4.

$$yi = Bi \exp\{-\oint_{l_i} dl \delta\mu(X,Y,Z)\} + ri \quad (1)$$

$$Bi = \int d\varepsilon Ii(\varepsilon) \exp\{-\oint_{l_i} dl\, \mu_0(X,Y,Z,\varepsilon)\} \quad (1)'$$

In the expression (1)', $\mu 0(X,Y,Z,\varepsilon)$ is an attenuation coefficient of the X-ray at a position (X,Y,Z) when supposing the X-ray having a photon energy $\varepsilon$ passes through the inside of the imaginary estimated structure S2 that has been estimated based on the design information of the measurement object S. On the other hand, $\mu(X,Y,Z,\varepsilon)$ in the expression (1) is a attenuation coefficient of the X-ray having a photon energy $\varepsilon$ at a position (X,Y,Z) when the X-ray passes through the inside of the measurement object S. The relationship between these attenuation coefficients is represented by expression (2).

$$\mu(X,Y,Z,\varepsilon) = \mu 0(X,Y,Z,\varepsilon) + \delta\mu(X,Y,Z) \quad (2)$$

Here, $\delta\mu(X,Y,Z)$ is an difference between both attenuation coefficients.

The expressions (1) and (1)' are derived from expression (2) as follows. The attenuation amount of the X-ray when the X-ray travels over a minute portion having a distance $\Delta l$ in the measurement object S is represented by expression (3) as below.

$$\mu(X,Y,Z,\varepsilon)\Delta l = \mu 0(X,Y,Z,\varepsilon)\Delta l + \delta\mu(X,Y,Z)\Delta l \quad (3)$$

Therefore, the X-ray having an intensity Ii ($\varepsilon$) that has entered the minute portion having a distance $\Delta l$ has an intensity represented by expression (4) at a point that the X-ray has been passed over a minute portion having a distance $\Delta l$.

$$Ii(\varepsilon)\exp\{-\mu(X,Y,Z,\varepsilon)\Delta l\} = Ii(\varepsilon)\exp\{-\mu_0(X,Y,Z,\varepsilon)\Delta l + \delta\mu(X,Y,Z)\Delta l\} \quad (4)$$

Therefore, the intensity yi of the X-ray that enters the detector 4 after passed through the inside of the measurement object S along its traveling direction is represented by expression (5).

$$\begin{aligned}
yi &= \int Ii(\varepsilon)\exp\{-\oint_{l_i} dl\mu(X,Y,Z,\varepsilon)\} \\
&= \int Ii(\varepsilon)\exp\{-\oint_{l_i} (dl_\mu(X,Y,Z,\varepsilon) + \delta\mu(X,Y,Z))\} \\
&= \int d\varepsilon Ii(\varepsilon)\exp\{-\oint_{l_i} dl\mu_0(X,Y,Z,\varepsilon)\} \\
&\quad \exp\{-\oint_{l_i} dl\delta\mu(X,Y,Z)\} + ri
\end{aligned} \quad (5)$$

Note that i indicates the position of one detection pixel among a plurality of detection pixels included in the detector 4. For instance, when a plurality of detection pixels are arranged in a line form in the detector 4, yi represents the intensity of the X-ray that enters an i-th detection pixel from a beginning. Moreover, ri represents a noise component such as dark current contained in the outputted from the detection pixel arranged at i-th position in the detector 4. That is, according to expression (5), intensities yi in numbers in correspondence to the number of detection pixels in the detector 4 are generated for each detected rotational position.

Here, in expression (5), by substituting $$\int d\varepsilon Ii(\varepsilon)\exp\{-\oint_{l_i} dl\mu_0(X,Y,Z,\varepsilon)\} = Bi$$

(that is, expression (1)'), expression (1) is obtained. As mentioned above, the attenuation coefficient $\mu 0(X,Y,Z,\varepsilon)$ is a attenuation coefficient of the X-ray at the position (X,Y,Z) of the inside of the estimated structure S2 and it depends on the design information of the measurement object S. As the design information, for instance, the material information about the material that constitutes the measurement object S may be used. The material information of the measurement object S may be, for instance, information about the ratio of materials contained in the measurement object S. Also, the material information of the measurement object S may be, for instance, information as to whether the material contained in the measurement object S is metal or nonmetal. The material information of the measurement object S may be, for instance, information about elements or compounds contained in respective members that constitute the measurement object S. As the design information, for instance, information about an external shape and/or an internal shape of the measurement object S may be used. The intensity Ii ($\varepsilon$) depends on the intensities and spectra of the X-rays irradiated to the measurement object S, which are measuring conditions under which the measuring device is operated. Therefore, Bi represented by the expression (1)' corresponds to the estimated detection intensity estimated to be detected by i-th detection pixel of the detector 4 that is calculated based on the design information, the material information, and the measuring conditions. That is, Bi corresponds to the transmission intensity of the X-ray that has passed through the estimated structure S2 when the X-rays are irradiated to the estimated structure S2 according to the measuring conditions. By arranging this Bi in numbers corresponding to the number of the detection pixels in the detector 4, data that corresponds to the above-mentioned estimated data D2 is obtained. Namely, the image generation unit 53 generates the estimated data D2 by applying the design information, the material information, and the measuring conditions to expression (1).

Then, Bi and ri are substituted into the right-hand side of the expression (1). Into yi of the left-hand side of the expression (1) is substituted the intensity of the X-ray that is actually detected by the detector 4. As mentioned above, since it is assumed that $\delta\mu(X,Y,Z)$ is a difference between the attenuation coefficient $\mu(X,Y,Z,\varepsilon)$ and the attenuation coefficient $\mu0(X,Y,Z,\varepsilon)$ and because supposing that it does not depend on the photon energy $\varepsilon$, the error term $\delta\mu(X,Y,Z)$ can be calculated.

Here, $\delta\mu(X,Y,Z)$ is a value that is based on a difference between a distance along which the X-ray that has passed through the inside of the measurement object S travels and a distance along which the X-ray that has passed through the inside of the estimated structure S2 travels at each of the plurality of detection pixels of the detector 4. That is, $\delta\mu(X,Y,Z)$ corresponds to a difference between the detection data D1 and the estimated data D2. Therefore, the image generation unit 53 calculates $\delta\mu(X,Y,Z)$ for a detected intensity that is outputted from each of the plurality of detection pixels arrayed in the detector 4 at each irradiation position of the X-ray irradiated to the measurement object S. By so doing, the image generation unit 53 extracts a plurality of sets of differential data D3 at each irradiation position of the X-ray irradiated to the measurement object S.

Then, the image generation unit 53 evaluates each of the $\delta\mu(X,Y,Z)$ values, whose number corresponds to the number of the detection pixels of the detector 4, calculated by expression (1) for any irradiation position of the X-ray The image generation unit 53, when all the calculated $\delta\mu(X,Y,Z)$ values do not exceed a first predetermined value, judges that the differential data D3 corresponds to the difference caused by a cavity or the like in the inside of the measurement object S (for instance, the defect S1 in FIG. 2). The image generation unit 53, when at least one of the calculated $\delta\mu(X,Y,Z)$ values is equal to or exceeds the first predetermined value, judges that the error in shape between the measurement object S1 and the estimated structure S2 is considerably large, that is, the size of the measurement object S differs from the design value considerably.

When all the calculated $\delta\mu(X,Y,Z)$ values do not exceed the first predetermined value, the image generation unit 53 performs back projection of the differential data D3 to generate a back projection image Im1 and combines it with the image Im2 of the estimated structure S2 to generate the image Im3. This enables one to evaluate location, shape, size and so on of defects, if any, in the inside of the measurement object S. On the other hand, when at least one of the calculated $\delta\mu(X,Y,Z)$ values is equal to or exceeds the first predetermined value, the image generation unit 53 performs, based on the $\delta\mu(X,Y,Z)$ value, correction of the estimated structure S2 so that it becomes closer to the shape of the measurement object S. Then, the image generation unit 53, based on the corrected size of the estimated structure S2, obtains $\delta\mu(X,Y,Z)$ in the same procedure as described above and evaluates its value. This procedure is repeated until all the calculated $\delta\mu(X,Y,Z)$ values will be below the first predetermined value.

FIG. 4 schematically illustrates the concept of correction of the estimated structure S2. In FIG. 4, in the same manner as in the case shown in FIG. 3 (a), a solid line indicates a detected intensity distribution L1 of the X-ray detected by the detector 4, that is, a detected intensity distribution of the X-ray that corresponds to the detection data D1, when the X-rays, that are outputted from the X-ray source 2, is irradiated to the measurement object S having the defect S1 in the inside thereof. Assuming that the X-rays are irradiated to the estimated structure S2 that corresponds to the measurement object S, estimated detection intensity distributions L2, L3, and L4 of the X-ray that are estimated to be detected by the detector 4, that is, estimated detection intensity distributions of the X-ray that correspond to the estimated data D2 are indicated in broken line. L2 indicates the estimated intensity distribution of the X-ray to which the first processing was performed but the correction of the shape of the estimated structure S2 was not performed yet. In FIG. 4, it is shown that L1 is higher than L2 in the transmission intensity distribution of the X-ray. This indicates that the transmission distance of the X-ray that transmits through the measurement object S is shorter than that of the designed size. That is, the size of the measurement object S is smaller than the design value. L3 and L4 indicate each an estimated intensity distribution of the X-ray that is estimated after the correction of the size of the estimated structure S2 in the second and subsequent processing are performed. In FIG. 4, the estimated transmission intensity of the X-ray for detection pixels included in the area ir among the plurality of the detection pixels included in the detector 4 is higher than the estimated transmission intensity of the X-ray for any one of detection pixels of the detector 4 other than those included in the area ir. This indicates that the defect S1 in the inside of the measurement object S gives sonic influence on the estimated intensity of the X-ray for pixels in the area ir. Each of the differences between the intensity distribution of L1 and the intensity distributions of L2, L3, or L4 shown in FIG. 4 correspond to $\delta\mu(X,Y,Z)$.

The image generation unit 53 changes the estimated transmission intensity distribution of the X-ray from L2 in the direction indicated by an arrow A, that is, in the direction in which the intensity increases in FIG. 4 by performing correction of the shape of the estimated structure S2. Correcting the shape of the estimated structure S2 corresponds to changing the distance in which the X-ray transmits through the inside of the estimated structure S. The image generation unit 53 changes the shape of the estimated structure S2 in a direction in which it becomes closer to the shape of the measurement object S In the case of this example, the intensities in correspondence to the area ir for L3 and L4 become higher than the intensities in correspondence to a remaining area other than the area ir. Of course, in the case of this example, the transmission distance of the X-ray that transmits through the measurement object is larger than that of the designed size Note that the size of the measurement object is larger than the design value, the relationship of the magnitude of L2 to that of L1 is in reverse to the above relationship.

When the shape of the estimated structure S2 is corrected to change the transmission intensity distribution of the X-ray that corresponds to the newly generated estimated data D2 from L2 to L3, new $\delta\mu(X,Y,Z)$ is calculated as a difference in transmission intensity distributions of the X-ray between L1 and L3. When this $\delta\mu(X,Y,Z)$ value is larger than the first predetermined value, the shape of the estimated structure S2 is further corrected based on $\delta\mu(X,Y,Z)$ value. When the estimated transmission intensity distribution of the X-ray changes from L2 or L3 to L4, the intensity distribution of the X-ray transmits through the measurement object S and the intensity distribution of the X-ray that is estimated to be passed through the estimated structure S2 after the correction of its shape are deemed identical to each other. That is, the value of $\delta\mu(X,Y,Z)$ that is newly calculated as a difference in transmission intensity between L1 and L4 is equal to or lower than the first predetermined value. This means that the estimated data D2 reproduces the transmission intensity distribution of the X-ray that has been passed through the measurement object S.

Note that the image generation unit 53 may be configured to align on data the measurement object S represented by the detection data D1 and the estimated structure S2 represented by the estimated data D2. For instance, the image generation unit 53 detects the position of a boundary (edge) (pixel position i) between the measurement object S represented by the detection data D1 and the background. The image generation unit 53 detects the pixel position i+a in correspondence to the boundary on the estimated data D2. The image generation unit 53 performs calculation by expression (1) using the detection data D1 at pixel i (that is, yi) and the estimated data D2 at pixel i±a (that is, Bi+a). As a result, at time of the first processing, the value of $\delta\mu(X,Y,Z)$ can be calculated as a relatively small value and hence the number of times of processing can be decreased even when subsequently correction of $\delta\mu(X,Y,Z)$ may become necessary.

The image generation unit 53 performs the above-mentioned processing on each of the plurality sets of the detection data D1 and each of the plurality of sets of the estimated data D2, each are based on different projection directions of X-ray toward the measurement object S, that is, each are based on different detected rotational position to effect alignment and subsequently synthesizes the back projection image Im1 with the image Im2 relating to the estimated structure S2 to generate the image Im3. The image generation unit 53 commands the display monitor 6 to display the generated image Im3 in a three-dimensional image.

Figure 5:
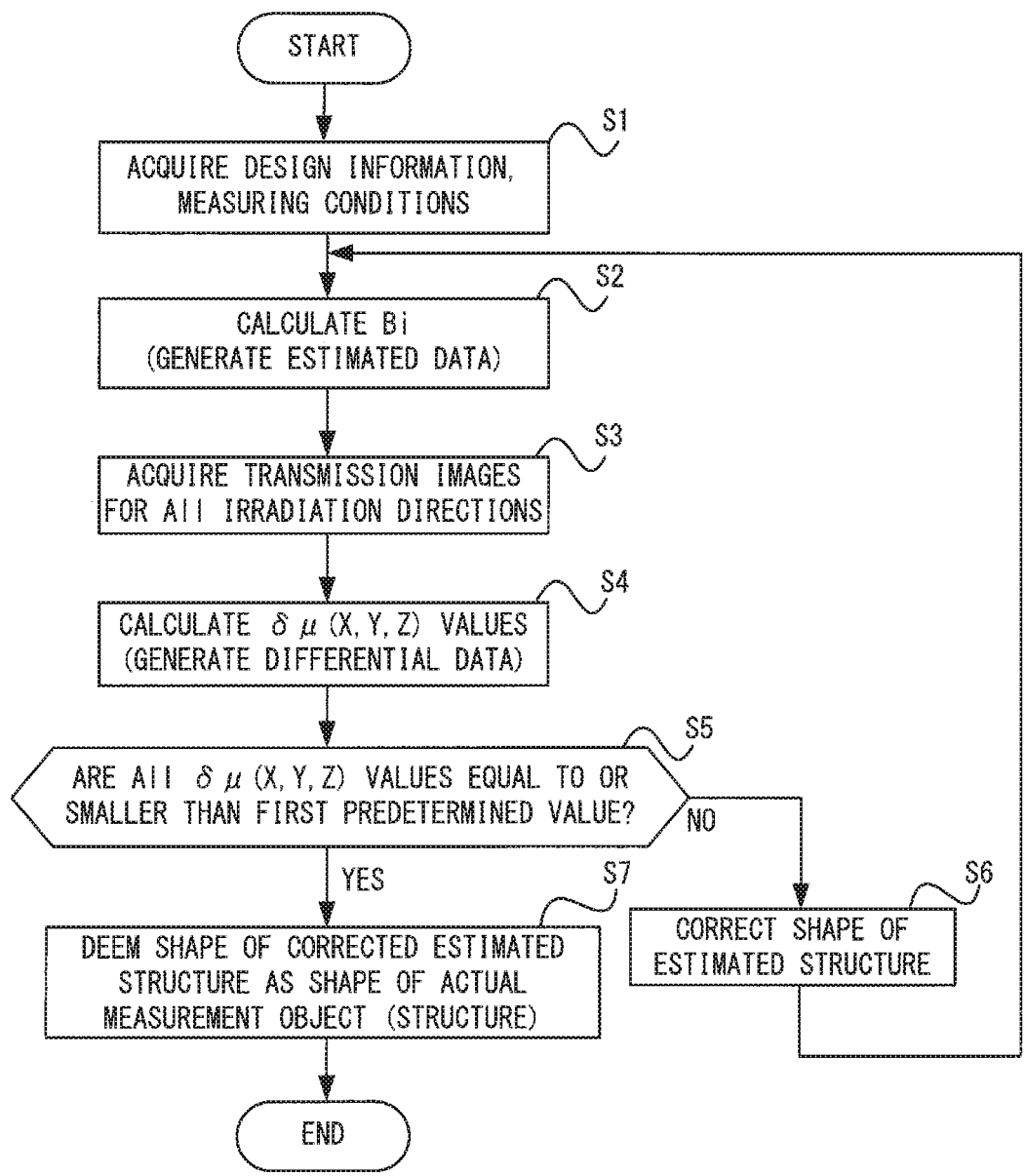
FIG. 5 is a flowchart explaining a process for generating a three-dimensional image according to the first and second embodiments.

Referring to the flowchart shown in FIG. 5, the processing of generating a three-dimensional image of the measurement object S by the image generation unit 53 will be explained. The processing shown in FIG. 5 is performed by executing a program by the image processing unit 53. The program is stored in a memory (not shown) in the control unit 5 and is activated and executed by the image generation unit 53. In Step S1, the shape information and the material information, which constitute design information of the measurement object S, and the measuring conditions for measuring the measurement object S, which is measuring device information, are acquired, and the procedure proceeds to Step S2. In Step S2, Bi for each of the pixels is calculated based on the shape information, the material information, and the measuring information using the above-mentioned expression (1)' (that is, estimated data D2 is generated) and the procedure proceeds to Step S3.

In Step S3, transmission images for all the irradiation directions are acquired and the procedure proceeds to Step S4. Note that in Step S3, the transmission image in all measuring directions is acquired for using in image reconfiguration. For instance, in FIG. 1, the transmission images that are acquired when the measurement object S is rotated by one turn of 360° with the stage 30. In Step S4, a detected value detected at each of the pixels by causing X-rays to be actually passed through the measurement object S and calculated Bi are substituted into expression (1) and $\delta\mu(X,Y,Z)$ value is calculated according to the back projection method (that is, differential data D3 is extracted) and the procedure proceeds to Step S5. In Step S5, it is determined whether all the position-dependent $\delta\mu(X,Y,Z)$ values that are calculated for the detection pixels, respectively, are equal to or smaller than the first predetermined value. When all the $\delta\mu(X,Y,Z)$ values are equal to or smaller than the first predetermined value, Step S5 is determined to be affirmative and the procedure proceeds to Step S7. When at least one of $\delta\mu(X,Y,Z)$ values exceeds the first predetermined value, Step S5 is determined to be negative and the procedure proceeds to Step S6. In Step S6, the shape of the estimated structure S2 is corrected and the procedure proceeds to Step S2. In this case, in Step S2, the shape of the estimated structure S2 that has been corrected in Step S6 is used as design to information (shape information) of the measurement object S.

In Step S7, since the back projection image Im1 of the differential data D3 is 0, the shape of the estimated structure S2, correction of which has thus far been continued, is deemed to match the shape of the measurement object S (structure). The image of the estimated structure S2 is displayed on the display monitor 6 as a three-dimensional image of the measurement object S and the processing is terminated. Note that the image to be displayed on the display monitor 6 is not limited to the image Im3 of the estimated structure S2.

According to the first embodiment described above, the following operations and advantageous effects are obtained.)

(1) The image generation unit 53 generates a plurality of sets of detection data D1 relating to the transmission intensity of the X-ray that has been passed through the measurement object S and a plurality of sets of estimated data D2 relating to the estimated transmission intensity of the X-ray on the assumption that the X-rays have been passed through an imaginary estimated structure S2 that is configured based on design information under the same irradiation condition as that under which the X-rays have been passed through the measurement object S. Using the detection data D1 and the estimated data D2 that correspond to each other with respect to the irradiation direction of the X-ray, the image generation unit 53 extracts differential data D3, which indicates the difference between the detection data D1 and the estimated data D2. Therefore, it is possible to acquire, from the detection data D1 of the measurement object S, information about defect S1 such as a cavity or the like in the inside of the measurement object S, which is not included in the estimated structure S2 that is estimated based on the design information and information about an error in shape between the measurement object S and the estimated structure S2.

(2) The image generation unit 53 performs back projection of the extracted differential data D3 to generate a back projection image Im1 relating to the difference and combines the back projection image Im1 with the estimated structure S2 to generate the image Im3 relating to the inside structure of the measurement object S. Therefore, the image Im3, of which generation of artifacts due to beam hardening is prevented or more reduced as compared with the back projection image obtained by performing back projection of the detection data D1, is generated. As a result, it becomes easier to grasp the inside defect of the measurement object S by the image Im3. In particular, even in the case of a detect such as a small cavity, generation of a trouble that it is difficult to grasp the shape and size of the measurement object S due to artifacts on its image can be prevented or reduced. That is, by preventing or reducing artifacts from being contained in the generated image, a decrease in inspection accuracy can be prevented or reduced. Furthermore, an image of which generation of artifacts due to beam hardening is prevented can be generated using expression (1) in contrast to the case in which artifacts due to beam hardening are reduced by correction. This contributes to a reduction in load of processing and to shortening of processing time. Note that according to the present embodiment, the differential data D3 is generated and reconstruction processing is performed using only the differential data D3 and thus it is possible to reduce the load of processing and shorten the time of processing.

(3) The image generation unit 53 generates estimated data D2 by estimating the transmission intensity of the X-ray when the X-rays are irradiated to the estimated structure S2 based on the material information of the measurement object S and spectrum information of the X-ray as the measuring condition of the measurement object S. Therefore, the estimated data D2 can be generated without requiring a large load of processing.

(4) The attenuation coefficient $\mu(X,Y,Z,\varepsilon)$ of the X-ray is expressed using the attenuation coefficient $\mu_0(X,Y,Z,\varepsilon)$, which is a first component that depends on the photon energy $\varepsilon$, and the error term $\delta\mu(X,Y,Z)$, which is a second component. The image generation unit 53 calculates the value of $\delta\mu(X,Y,Z)$ using the detection data D1 and the estimated data D2, thereby extracting differential data D3. Therefore, in contrast to the case of solving an approximation expression that depends on the photon energy $\varepsilon$ by the conventional technology, in which an influence of artifacts due to beam hardening remains in the generated back projection image, it is possible that the influence of artifacts due to beam hardening in the generated image Im3 is to be reduced and an image Im3 having a high image quality is to be provided.

(5) The image generation unit 53 performs back projection of the differential data D3 to generate a back projection image Im1 when all the values of $\delta\mu(X,Y,Z)$ that are calculated with respect to a certain irradiation direction of the X-ray do not exceed the first predetermined value. Therefore, a back projection image Im1 can be generated so that a small cavity or the like included in the measurement object S can be observed.

(6) The image generation unit 53, when a plurality of $\delta\mu(X,Y,Z)$ values calculated for a certain irradiation direction of an X-ray exceeds the first predetermined value, corrects the estimated data D2 based on the $\delta\mu(X,Y,Z)$ values to generate new estimated data D2. Therefore, the defect such as a small cavity or the like included in the measurement object S can be correctly evaluated in condition that the error in shape between the measurement object S and the estimated structure S2 is sufficiently small.

(7) The image generation unit 53, when it generates new estimated data D2, extracts new differential data D3 using the detection data D1 and the new estimated data D2. The image generation unit 53, when the new differential data D3 does not exceed the first predetermined value, performs back projection of the new differential data D3 to generate a back projection image Im1. Thereafter, the image generation unit 53 combines the back projection image Im1 with the image Im2 relating to the estimated structure S2 to generate an image Im3 that relates to the inside structure of the measurement object S. Therefore, since the image of the estimated structure S2, whose shape is substantially identical to that of the measurement object S, is combined with the back projection image Im1 that shows a defect or the like, the shape that may be deemed to be identical to that of the measurement object S that is actually measured can be reproduced on an image of which occurrence of artifacts due to beam hardening is reduced. That is, a defect or the like in the inside of the actually measured measurement object S can be understood with ease.

Second Embodiment

Referring to the drawings, a second embodiment of the present invention will be explained. In the following explanation, the same components as those in the first embodiment are assigned the same reference signs and explanation thereof is focused mainly on differences with the first embodiment. What is not particularly explained is the same as that in the first embodiment.

In the second embodiment, the image generation unit 53 generates estimated data D2 based on the concept that is explained in the first embodiment using the following expressions (7) and (7)' and extracts differential data D3 from the detection data D1 that is based on the output from the detector 4. As described later, the image generation unit 53 generates estimated data D2 by calculating Ai using expression (7)' and calculates $\delta\mu(X,Y,Z)$ by substituting the calculated Ai into expression (7), thereby extracting the differential data D3.

$$A_i \exp\{-\int dl \delta\mu(X,Y,Z)\} + ri \quad (7)$$

$$A_i = \int d\varepsilon I_i(\varepsilon) \exp\{-f_{PE}(\varepsilon) \int dl \alpha_1(X,Y,Z) - f_{KN}(\varepsilon) \int dl \alpha_2 (X,Y,Z)\} \quad (7)'$$

The expressions (7) and (7)' are derived as follows. In the present embodiment, the attenuation coefficient $\mu(X,Y,Z,\varepsilon)$ of the X-ray having a photon energy $\varepsilon$ at a position $(X,Y,Z)$ where the X-rays pass through the measurement object S is assumed to be represented by expression (8) as follows.

$$\mu(X,Y,Z,\varepsilon) = \alpha_1(X,Y,Z)f_{PE}(\varepsilon) + \alpha_2(X,Y,Z)f_{KN}(\varepsilon) + \delta\mu(X,Y,Z) \quad (8)$$

$\alpha_1(X,Y,Z)$ indicates a spatial distribution of reduction of the X-ray by photoelectric absorption in the measurement object S and $\alpha_2(X,Y,Z)$ indicates a spatial distribution of reduction of the X-ray due to the Compton effect in the measurement object S. Both $\alpha_1(X,Y,Z)$ and $\alpha_2(X,Y,Z)$ are known values that depend on the material of the measurement object S and are stored in a memory (not shown) in advance. Both $f_{PE}(\varepsilon)$ and $f_{KN}(\varepsilon)$, which are functions that depend on the photon energy $\varepsilon$, are represented by the following expressions (9) to (11), respectively.

$$f_{PE}(\varepsilon) = \frac{1}{\varepsilon^1} \quad (9)$$

$$f_{KN}(\varepsilon_0) = \frac{1+\varepsilon_0}{\varepsilon_0^2}\left[\frac{2(1+\varepsilon_0)}{1+2\varepsilon_0} - \frac{1}{\varepsilon_0}\ln(1+2\varepsilon_0)\right] + \frac{1}{2\varepsilon_0}\ln(1+2\varepsilon_0) - \frac{1+3\varepsilon_0}{(1+2\varepsilon_0)^2} \quad (10)$$

$$\varepsilon_0 = \frac{\varepsilon}{510.975 \text{ keV}} \quad (11)$$

Note that 510.975 keV in expression (11) corresponds to static energy of an electron and $\varepsilon_0$ represents photon energy of the X-ray that is normalized with the static energy of the electron.

Therefore, $\alpha_1(X,Y,Z)f_{PE}(\varepsilon) + \alpha_2(X,Y,Z)f_{KN}(\varepsilon)$ in expression (8) is information relating to a attenuation of the X-ray when the X-ray having a photon energy $\varepsilon$ passes through the inside of the estimated structure S2, which is estimated as the measurement object S in an ideal state based on the material information of the measurement object S. $\delta\mu(X,Y,Z)$ is a term indicating an error between the attenuation coefficient $\mu(X,Y,Z,\varepsilon)$ of the X-ray having a photon energy $\varepsilon$ at a position $(X,Y,Z)$ when the X-ray passes through the inside of the measurement object S and the information relating to the attenuation described above. Note that the attenuation coefficient $\mu(X,Y,Z,\varepsilon)$, the functions $f_{PE}(\varepsilon)$ and $f_{KN}(\varepsilon)$ are elements that depend on the photon energy $\varepsilon$. $\delta\mu(X,Y,Z)$ is an element that is assumed not to depend on the photon energy $\varepsilon$.

Assuming the X-ray travels along a minute portion having a distance $\Delta l$ through the measurement object S, the attenuation coefficient of the X-ray is represented by the following expression (12) using expression (8).

$$\mu(X,Y,Z,\varepsilon)\Delta l = \{\alpha_1(X,Y,Z)f_{PE}(\varepsilon) + \alpha_2(X,Y,Z)f_{KN}(\varepsilon)\} + \delta\mu(X,Y,Z)\Delta l \quad (12)$$

The expression (12) is changed using the spectrum Ii ($\varepsilon$) of the X-ray that enters the pixels of the detector 4 in the same manner as the case in the first embodiment in which using expression (4) and then derives expression (5), the intensity yi of the X-ray that enters the detector 4 according to the present embodiment is substituted to obtain expression (13).

$$yi = \int Ii(\varepsilon)\exp\left\{-\oint_l dl \mu(X,Y,Z,\varepsilon)\right\} \quad (13)$$

$$= \int Ii(\varepsilon)\exp\left\{-\oint_l dl(\alpha_1(X,Y,Z)f_{PE}(\varepsilon) + \alpha_2(X,Y,Z)f_{KN}(\varepsilon) + \delta\mu(X,Y,Z))\right\}$$

$$= \int d\varepsilon Ii(\varepsilon)\exp\left\{\begin{array}{l}-f_{PE}(\varepsilon)\oint_l dl\alpha_1(X,Y,Z) - f_{KN}(\varepsilon) \\ \oint_l dl\alpha_2(X,Y,Z) - \oint_l dl\delta\mu(X,Y,Z)\end{array}\right\} + ri$$

$$= \exp\left\{-\oint_l dl\delta\mu(X,Y,Z)\right\}\int d\varepsilon Ii(\varepsilon)\exp$$

$$\left\{-f_{PE}(\varepsilon)\oint_l dl\alpha_1(X,Y,Z) - f_{KN}(\varepsilon)\oint_l dl\alpha_2(X,Y,Z)\right\} + ri$$

Note that also in expression (13), i indicates the position of one pixel among a plurality of pixels included in the detector 4. Also, ri represents a noise component such as dark current contained in the output from the i-th pixel arranged in the detector 4.

In expression (13), by defining $$\int d\varepsilon Ii(\varepsilon)\exp\{-f_{PE}(\varepsilon)\oint_l dl\alpha_1(X,Y,Z) - f_{KN}(\varepsilon)\oint_l dl\alpha_2(X,Y,Z)\}$$

as Ai, expression (7)' is derived. As mentioned above, $\alpha_1(X,Y,Z)$ and $\alpha_2(X,Y,Z)$ are values that depend on the design information of the measurement object S. The intensity Ii ($\varepsilon$) depends on the intensity and spectrum of the X-ray, as the measuring conditions of the measuring device, which is irradiated to the measurement object S. Therefore, Ai represented by expression (7)' corresponds to the calculated detection intensity assuming to be detected by the i-th detection pixel of the detector 4 based on the design information and the measuring conditions. That is, Ai, like Bi in the first embodiment, corresponds to the transmission intensity of the X-ray that is assumed to being passed through the estimated structure S2 when the X-ray assumed to be irradiated to the estimated structure S2 according to the measuring conditions. That is, it corresponds to the estimated data D2. Therefore, the image generation unit 53 generates the estimated data D2 by applying the design information and the measuring conditions to expression (7)'.

Then, Ai and ri are substituted into the right-hand side of expression (7). Into the left-hand side of expression (7) is substituted the intensity of the X-ray that is actually detected by the detector 4. $\delta\mu(X,Y,Z)$ represents an error between the sum of the attenuation coefficient due to the photoelectric effect and the attenuation coefficient due to the Compton effect and the attenuation coefficient $\mu(X,Y,Z,\varepsilon)$, and $\delta\varepsilon(X,Y,Z)$ does not depend on the photon energy $\varepsilon$, so that the error term $\delta\mu(X,Y,Z)$ can be calculated.

Hereafter, the image generation unit 53 performs the same processing as that in the first embodiment. That is, the image generation unit 53 evaluates the magnitude relationship between the calculated $\delta\mu(X,Y,Z)$ value and the first predetermined value and depending on the result of the evaluation, performs a generation of a back projection image and displaying a three-dimensional image, or performs a generation of a back projection image and displaying a three-dimensional image after correcting the estimated. data D2.

Also, in the second embodiment, the image generation unit 53 performs series of processing shown in the flowchart of FIG. 5 in the first embodiment to generate a three-dimensional image. However, in Step S3, the image generation unit 53 calculates Ai using expression (7)' and generates the estimated data D2. Also, in Step S4, the image generation unit 53 calculates $\delta\mu(X,Y,Z)$ using expression (7).

Note that in the above explanation, the image generation unit 53 uses $\alpha_1(X,Y,Z)$, which is information relating to the photoelectric absorption, and $\alpha_2(X,Y,Z)$, which is information relating to the Compton effect for expressing the attenuation coefficient $\mu(X,Y,Z,\varepsilon)$. However, the attenuation coefficient $\mu(X,Y,Z,\varepsilon)$ may be expressed using either one of $\alpha_1(X,Y,Z)$ or $\alpha_2(X,Y,Z)$. For instance, for expressing the attenuation coefficient $\mu(X,Y,Z,\varepsilon)$, when the photon energy $\varepsilon$ of the X-rays that are irradiated to the measurement object S is relatively small, the image generation unit 53 uses the information relating to the photoelectric absorption, $\alpha_1(X,Y,Z)$, and when the photon energy $\varepsilon$ is relatively large, the image generation unit 53 uses the information relating to the Compton effect, $\alpha_2(X,Y,Z)$.

According to the second embodiment as described above, in addition to the operations and advantageous effects (1), (2), and (4) to (7) obtained according to first embodiment, the following operations and advantageous effects can be obtained. The image generation unit 53 generates the estimated data D2 based on the spectrum information of the X-ray that enters the measurement object S and at least one of the information of, $\alpha_1(X,Y,Z)$, which is information relating to the photoelectric absorption of the X-ray that is passed through the measurement object S, and $\alpha_2(X,Y,Z)$, which is information relating to the Compton effect of the X-ray that is passed through the measurement object S. That is, the image generation unit 53 calculates Ai using the to expression (7)'. Therefore, the estimated data D2 can be generated without requiring a large load of processing.

Third Embodiment

Referring to the drawings, a third embodiment of the present invention will be explained. In the following explanation, the same components as those in the first embodiment are assigned the same reference signs and explanation thereof is focused mainly on differences between this embodiment and the first embodiment. What is not explained particularly is the same as that in the first embodiment. The present embodiment is different from the first embodiment in that conforming product determination on the measurement object is performed using extracted differential data.

The image generation unit 53 calculates $\delta\mu(X,Y,Z)$, that is, extracts differential data D3 using expression (1) in the same manner as that in the first embodiment. The image generation unit 53 determines the magnitude relationship between the calculated $\delta\mu(X,Y,Z)$ and the second predetermined value. Note that the second predetermined value may be, for instance, an acceptable tolerance value of the measurement object S. When $\delta\mu(X,Y,Z)$ is equal to or smaller than the second predetermined value, it is determined that the shape of the measurement object S is within an acceptable tolerance range with respect to the shape of the estimated structure S2. That is, in this case the image generation unit 53 determines that the measurement object S does not have a large error in shape with respect to the design dimensions and determines that this measurement object S is a conforming product. If the measurement object S is determined to be a conforming product, the image generation unit 53 performs generation of a back projection image Im1, combination of the back projection image Im1 with the image Im2 relating to the estimated structure S2, and generation of the image Im3 in the same manner as that in the first embodiment. The image generation unit 53 generates a three-dimensional image using the image Im3 and displays it on the monitor 6. That is, the image generation unit 53 deems that the estimated structure S2 obtained by repeating corrections until the back projection image Im1 of the differential data D3 becomes 0 matches the shape of the actual measurement object S and the image generation unit 53 generates a three-dimensional image using the image Im3. Of course, the image Im3 may be displayed in comparison with the design image, or only a differential image between the image Im3 and the design image may be displayed.

When $\delta\mu(X,Y,Z)$ exceeds the second predetermined value, the image generation unit 53 determines that the shape of the measurement object S exceeds an acceptable tolerance range with respect to the shape of the estimated structure S2. That is, it determines that the measurement object S has a significantly large error in shape with respect to the design dimensions. In this case the image generation unit 53 determines that the measurement object S is a defective product and does not perform subsequent processing. Note that the image generation unit 53 may not display the three-dimensional image of the measurement object S on the display monitor 6 and may, for instance, display a warning notifying that the measurement object S is a defective product on the monitor 6. Note that even when the image generation unit 53 determines that the measurement object S is a defective product, it may generate a three-dimensional image of the measurement object S and displays it on the display monitor 6. In this case, the image generation unit 53 may display a warning notifying that the measurement object S is a defective product in superposition to the three-dimensional image of the measurement object S displayed on the display monitor 6. Note that although in the above explanation, the image generation unit 53 calculates $\delta\mu(X,Y,Z)$ in the same manner as that in the first embodiment, it may be configured to calculate $\delta\mu(X,Y,Z)$ in the same manner as that in the second embodiment.

Figure 6:
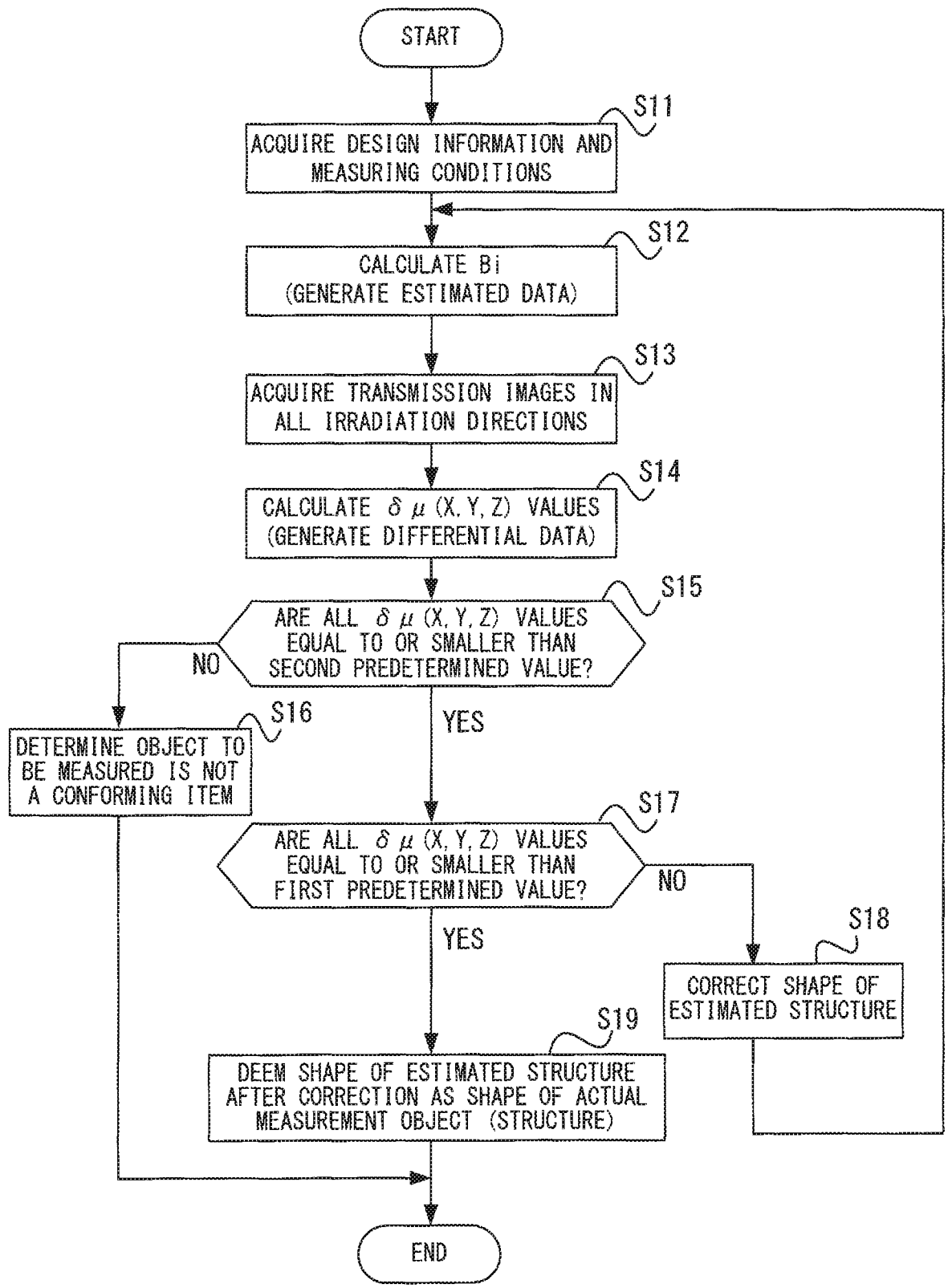
FIG. 6 is a flowchart explaining a process for generating a three-dimensional image according to the third embodiment.

Referring to the flowchart shown in FIG. 6, the generation processing of a three-dimensional image of the measurement object S by the image generation unit 53 will be explained. The processing illustrated in FIG. 5 is performed by executing a program by the image processing unit 53. This program is stored in a memory (not shown) in the control unit 5 and booted and executed by the image generation unit 53. Each processing of from Step S11 (acquisition of design information and measuring conditions) to Step S14 (extraction of differential data) is similar to each processing in Step S1 (acquisition of design information and measuring condition) to Step S4 (extraction of differential data) in FIG. 5.

In Step S15, it is determined whether all the position-dependent $\delta\mu(X,Y,Z)$ values that are calculated for respective pixels are equal to or smaller than the second predetermined value. When all the $\delta\mu(X,Y,Z)$ values are equal to or smaller than the second predetermined value, Step S15 is determined to be affirmative and the procedure proceeds to Step S17. When at least one of the $\delta\mu(X,Y,Z)$ values exceeds the second predetermined value, Step S15 is determined to be negative and the procedure proceeds to Step S16. In Step S16, the measurement object S is determined to be a defective product and the processing is terminated. Note that in Step S16, a message that the measurement object S is a defective product or the like may be displayed on the display monitor 6.

Each processing of from Step S17 (determination of magnitude relationships between each of the $\delta\mu(X,Y,Z)$ values and the first predetermined value) to Step S19 (deeming the shape of the corrected estimated structure as the shape of the actual measurement object (structure)) is similar to each processing of from Step S5 (determination of magnitude relationships between each of the $\delta\mu(X,Y,Z)$ values and the first predetermined value) to Step S7 (deeming the shape of the corrected estimated structure as the shape of the actual measurement object (structure) in FIG. 5. However, when the processing in Step S13 is performed again via Step S18, the determination in Step S15 is skipped and the procedure proceeds to Step S17.

According to the third embodiment as explained above, the following operations and advantageous effects can be obtained in addition to the operations and advantageous effects obtained in the first embodiment and/or in the second embodiment.

(1) The image generation unit 53, when $\delta\mu(X,Y,Z)$ values that correspond to the differential data D3 do not exceed the second predetermined value, determines the measurement object S to be a conforming product. Therefore, it becomes possible to use $\delta\mu(X,Y,Z)$ values in processing other than the generation of images, so that convenience can be increased.

(2) The image generation unit 53, when it determines the measurement object S as a conforming product based on the differential data D3, performs back projection of the differential data D3 to generate a back projection image Im1 and combines it with the image Im2 relating to the estimated structure S2 to generate an image Im3 of the inside structure of the measurement object S. Therefore, in case where the measurement object S does not have a large error in shape, the Im3 relating to the inside structure of the measurement object S can be generated. This enables prevention of any possible increase in load to be caused by generation of images of low necessity for the measurement object S that has been determined to be a defective product can be prevented.

Fourth Embodiment

Referring to the drawings, a structure manufacturing system according to an embodiment of the present invention will be explained. The structure manufacturing system according to the present embodiment manufactures molding products, for instance, door parts, engine parts, or gear parts for automotive use, and electronic components provided with circuit boards, and the like.

Figure 7:
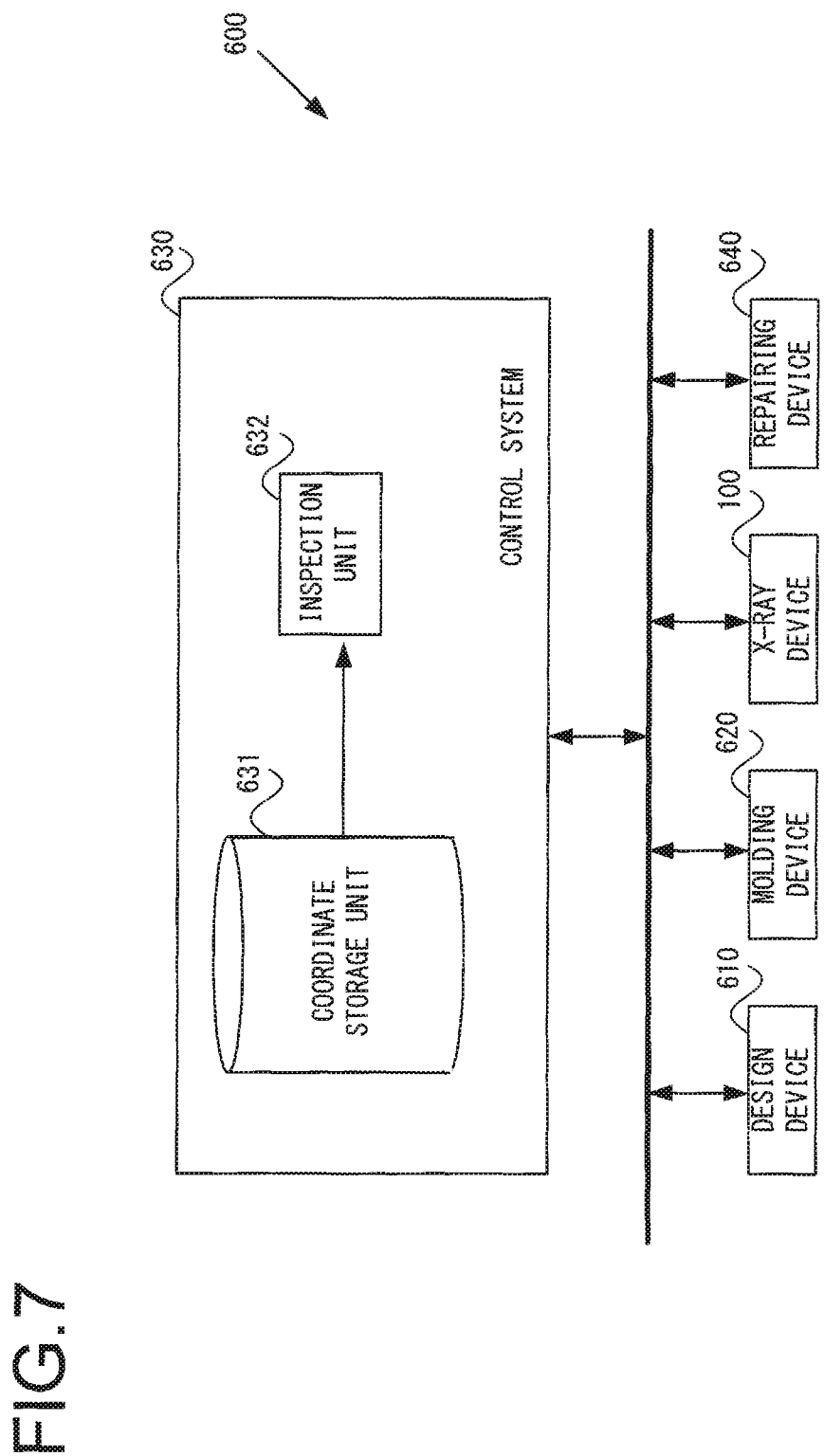
FIG. 7 is a block diagram showing the configuration of a structure manufacturing system according to the fourth embodiment.

FIG. 7 is a block diagram showing an example of the configuration of a structure manufacturing system 600 according to the present embodiment. The structure manufacturing system 600 includes the X-ray device 100 explained in any one of the first to third embodiments and variation examples thereof, a design device 610, a molding device 620, a control system 630, and a repairing device 640.

The design device 610, which is a device that is used by the user for generating design information relating to the shape of a structure, performs design processing to generate design information and store it. The design information is information that indicates respective positions of the structure on the coordinate. The design information is outputted to the molding device 620 and the control system 630 described later. The molding device 620 performs molding processing to manufacture the structure based on the design information generated by the design device 610. The molding device 620 that performs at least one of a lamination processing represented by 3D printing processing, a casting processing, a forging processing, and a cutting processing is included as an aspect of the present invention.

The X-ray device 100 performs measurement processing in which the shape of the structure molded by the molding device 620 is measured. The X-ray device 100 outputs information that indicates coordinate information (hereafter, referred to as "shape information") of the structure, which information is a result of measurement of the structure to the control system 630. The control system 630 includes a coordinate storage unit 631 and an inspection unit 632. The coordinate storage unit 631 stores the design information generated by the design device 610.

The inspection unit 632 determines whether the structure molded by the molding device 620 has been manufactured according to the design information generated by the design device 610. In other words, the inspection unit 632 determines whether the manufactured structure is a conforming product. In this case, the inspection unit 632 reads out the design information stored at the coordinate storage unit 631 and performs inspection processing, in which the design information is compared with the shape information that is inputted from the image measuring device 100. The inspection unit 632 performs, as inspection processing, comparison of, for instance, coordinates indicated by the design information with corresponding coordinates indicated by the shape information and determines, when the coordinates of the design information matches the coordinates of the shape information as a result of the inspection processing, that the structure is a conforming product that has been manufactured according to the design information.

When the coordinates of the design information does not match the coordinates of the shape information, the inspection unit 632 determines whether a difference in coordinates is within a predetermined range. If the difference is within the predetermined range, the inspection unit 632 determines that the structure is a repairable defective product.

When the structure is determined to be a repairable defective product, the inspection unit 632 outputs repair information that indicates a defective region and an amount of correction to a repairing device 640. The defective region indicates the region in which the coordinates of the shape information does not match the coordinates of the design information, and the amount of correction is a difference between the coordinates of the design information and the coordinates of the shape information in the defective region. The repairing device 640 performs repair processing in which the defective region of the structure is reprocessed based on the inputted repair information. The repairing device 640 in repair processing performs again processing similar to the molding processing performed by the molding device 620.

Figure 8:
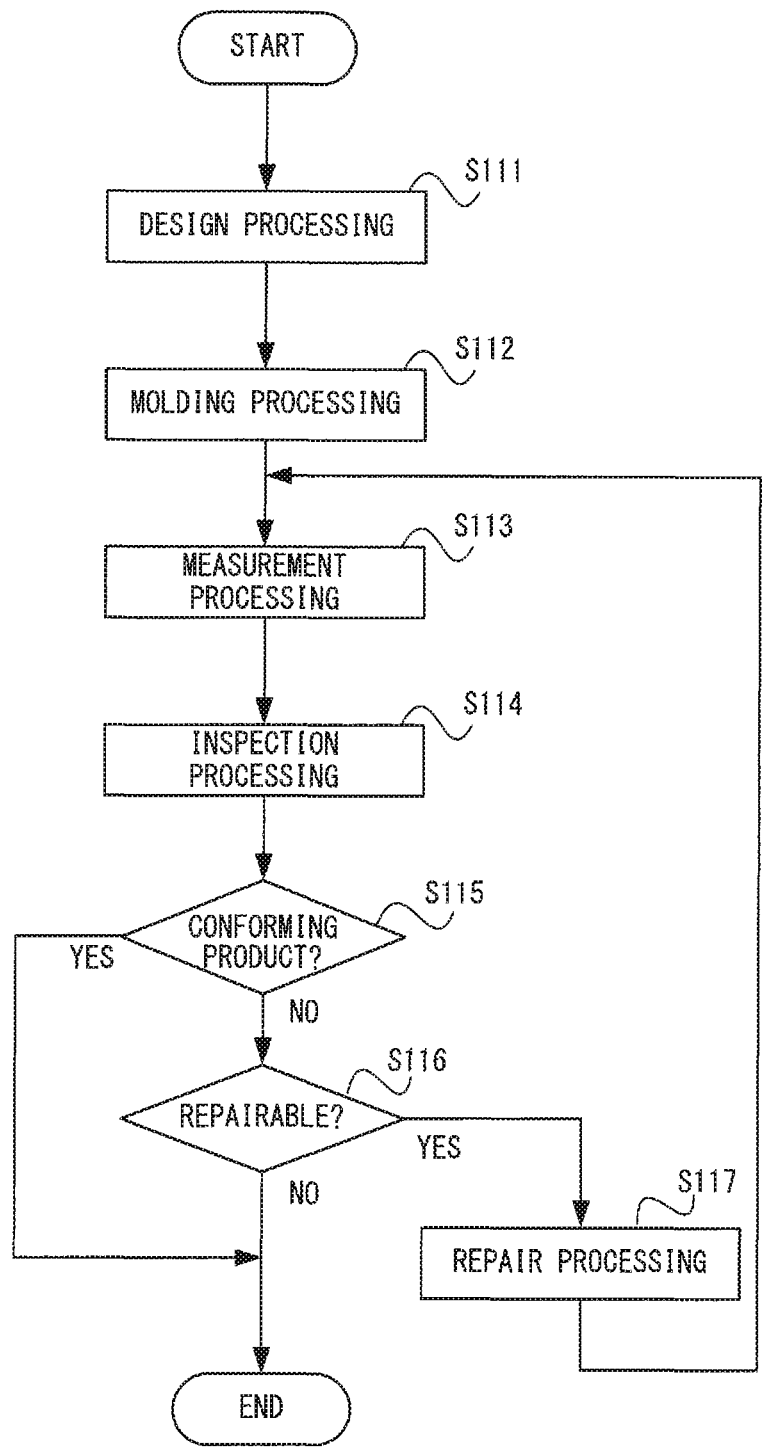
FIG. 8 is a flowchart explaining the operation of a structure manufacturing system according to the fourth embodiment.

Referring to the flowchart illustrated in FIG. 8, the processing that the structure manufacturing system 600 performs will be explained. In Step S111, the design device 610, which is used by the user for designing a structure, performs design processing to generate design information relating to the shape of the structure and stores it. Then the procedure proceeds to Step S112. Note that the design information is not limited to the one that is generated by the design device 610. According to an aspect of the present invention, the design device 610 may, when there is the design information that has already been prepared, acquire such design information by inputting it therein. In Step S112, the molding device 620 performs molding processing to manufacture a structure based on the design information and the procedure proceeds to Step S113. In Step S113, the image measuring device 100 performs measurement processing to measure the shape of the structure and outputs shape information, and then the procedure proceeds to Step S114.

In Step S114, the inspection unit 632 performs inspection processing in which the design information generated by the design device 610 is compared with the shape information acquired by measurement and outputted by the image measuring device 100, and then the procedure proceeds to Step S115. In Step S115, the inspection unit 632 determines whether the structure manufactured by the molding device 620 is a conforming product based on the result of the inspection processing. When the structure is a conforming product, that is, when the coordinates of the design information matches the coordinates of the shape information, Step S115 is determined to be affirmative and the processing is terminated. When the structure is not a conforming product, that is, the coordinates of the design information does not match the coordinates of the shape information, or coordinate information that are not contained in the design information are detected, Step S115 is determined to be negative, and then the procedure proceeds to Step S116.

In Step S116, the inspection unit 632 determines whether the defective region of the structure is repairable. When the defective region is not repairable, that is, a difference between the coordinates of the design information and the coordinates of the shape information in the defective region exceeds a predetermined range, Step S116 is determined to be negative, and then the processing is terminated. When the defective region is repairable, that is, a difference between the coordinates of the design information and the coordinates of the shape information in the defective region is within the predetermined range, Step S116 is determined to be affirmative, and then the procedure proceeds to Step S117. In this case, the inspection unit 632 outputs repair information to the repairing device 640. In Step S117, the repairing device 640 performs repair processing to the structure based on the inputted repair information, and then the procedure returns back to Step S113. Note that as mentioned above, the repairing device 640 performs again processing similar to the molding processing performed by the molding device 620 in the repair processing.

The structure manufacturing system according to the fourth embodiment described above, the following operations and advantageous effects are obtained.

(1) The X-ray device 100 in the structure manufacturing system 600 performs measurement processing, in which the shape information of the structure generated by the molding device 620 by the design processing performed by the design device 610 is acquired and the inspection unit 632 in the control system 630 performs inspection processing, in which the shape information acquired by the measurement processing is compared with the design information generated in the design processing. Therefore, it is possible to inspect the defect of the structure or acquire the information of the inside of the structure by a non-destructive inspection and determine whether the structure is a conforming product that has been manufactured according to the design information. This contributes quality control of the structure.

(2) The repairing device 640 is configured to perform repair processing in which the molding processing is performed again to the structure depending on the result of comparison in the inspection processing. Therefore, when the defective region of the structure is repairable, processing similar to the molding processing can be performed to the structure again. This contributes to manufacture of a high quality structure that is approximate to the design information.

As explained above, according to the present invention, data showing a difference between the measurement object and an estimated structure obtained based on the shape information of the measurement object can be extracted. Also, variation examples as described below are within the scope of the present invention and one or more variation examples may be combined with the above-mentioned embodiments.

(1) In the X-ray device 100 according to any one of the first to fourth embodiments, the image generation unit 53 has been explained as estimating the shape of the estimated structure S2 using the shape information contained in the design information. However, the X-ray device 100 may be one that generates the estimated data D2 based on the detection data D1 of the measurement object S. In this case, the image generation unit 53 performs back projection of the detection data D1 of the measurement object S using, for instance, filtered back projection (FBP) to generate an image. Since this image is expressed by a contrasting density in correspondence to the intensity of the X-ray that has been passed through the measurement object S, the image generation unit 53 estimates a substance that constitutes the measurement object S, that is, a material based on this contrasting density. For instance, the image generation unit 53 is configured to have data in which the density of the image is in relation to the material and estimate the material based on the density of the generated image, that is, the intensity of the X-ray. The image generation unit 53 may use the estimated material as the material information and calculate Bi according to expression (1)' to generate the estimated data D2. In this case, the material information of the measurement object S is acquired from projection image of the measurement object S in Step S1 of FIG. 5 or Step S11 of FIG. 6. Therefore, when no material information is obtained as the design information of the measurement object S, the estimated data D2 can be generated.

(2) The image generation unit 53 may be configured to extract shape information of the measurement object S by performing edge detection or the like using the back projection image of the measurement object S. In this case, by setting an irradiation direction of the X-ray for each small rotation angle to increase the number of detection data to be generated, thereby increasing the number of edges, that is, the number of profile shape of the measurement object S, the shape of the measurement object S can be obtained with high precision. In particular, when the measurement object S has a complicated profile shape, it is advantageous to increase the number of irradiation directions so that the number of detection data increases.

The image generation unit 53 may be configured to extract the profile shape of the measurement object S using an image of the measurement object S captured by an image-capturing device such as a camera and to use the extracted external contour as the shape of the estimated structure S2. In this case, the X-ray device 100 includes an image-capturing device (not shown) provided with image sensors that are constituted by CMOS, CCD or the like. The image-capturing device, which is provided on a part of the ceiling of the housing 1 (on the internal wall surface on the positive side of Y-axis), captures an image of the external appearance of the measurement object S mounted on the mount stage 30 along the Y-axis direction that is substantially orthogonal to the direction of projection of the X-ray (Z-axis) and the image-capturing device outputs the generated image signal to the control unit 5. The image generation unit 53 performs known (edge) detection processing and the like to the inputted image signal to extract a contour of the measurement object S on the image signal. Note that the image-capturing device is preferably one that is capable of capturing images over a wide range so that the measurement object S in whole can be captured regardless of the position of the measurement object S that may be varied by the Y-axis movement unit 33 and the X-axis movement unit 34. Alternatively, the image-capturing device may be provided so that it can be moved in synchronization with the movements of the Y-axis movement unit 33 and the X-axis movement unit 34.

Note that the shape information is not limited to one that is obtained by the image-capturing device. For instance, the shape information may include information obtained by measuring the measurement object S using a profile projector that projects the optical image of the measurement object S on a screen, or a shape measuring device, which is a contact type three-dimensional measuring device using a touch probe, or which is a non-contact type three-dimensional measuring device, such as a scanning laser probe type or an optical type.

(3) The mount stage 30 on which the measurement object S is mounted is not limited to one that is moved along X-axis direction, Y-axis direction, and Z-axis direction by the X-axis movement unit 34, the Y-axis movement unit 33, and the Z-axis movement unit 35, respectively. In one aspect of the present invention, the mount stage 30 may be one that does not move along the X-axis, the e Y-axis, and the Z-axis direction but instead causes the X-ray source 2 and the detector 4 move along the X-axis direction, the Y-axis direction, and the Z-axis direction, respectively, relative to the measurement object S. In one aspect of the present invention, the X-ray device 100 may be structured so that the mount stage 30 does not rotate but the X-ray source 2 and the detector 4 rotate about the rotation axis Yr instead of the mount stage 30 that rotates about the rotation axis Yr. Note that in the above-mentioned embodiments, for instance, in Step S3 of FIG. 5, it may be configured that after transmission images are acquired for a plurality of irradiation directions of the X-ray, the differential data D3 may be generated using only a part of the transmission images.

(4) The function of an interface through which the detection data D1, the design information of the measurement object S, and the measuring conditions are inputted and the function of the image generation unit 53 may be implemented by a computer. In this case the implementation may be achieved by storing a program for implementing the function of the image generation processing into a computer-readable recording medium and causing a computer system to read in the above-mentioned program relating to image generation that is stored in the recording medium and execute it. Note that the "computer system" as used herein includes hardware such as an OS (Operating System) and peripheral devices. The "computer-readable recording medium" as used herein includes portable recording media such as a flexible disk, a magneto-optical disk, an optical disk, and a memory card and so on, and a storage device such as a hard disk incorporated in the computer system. Furthermore, the "computer-readable recording medium" as used herein may include a thing that can hold a program for a short time and dynamically such as a communication wire in case a program is transmitted through a network such as an internet or a telephone line, and a thing that holds the program for a certain period of time such as a volatile memory in the inside of the computer system serving as a server or a client in such a case. The program may be one that implements a part of the above-mentioned function or that implements the above-mentioned function in combination with the program that has already been stored in the computer system.

Figure 9:
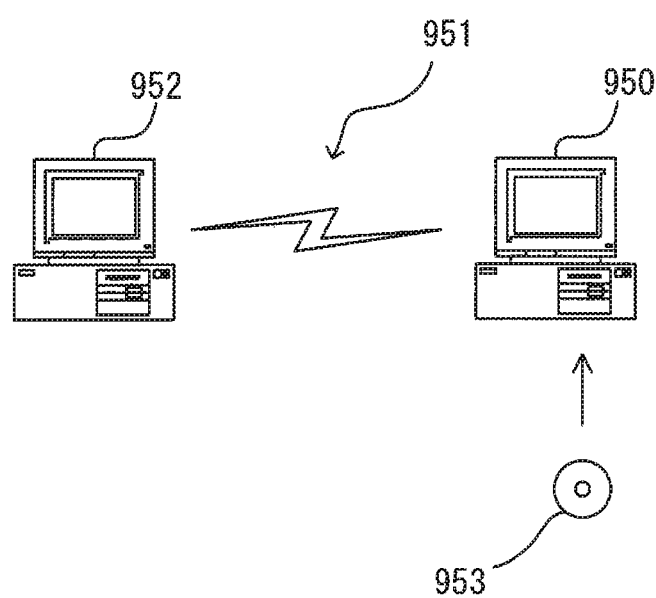
FIG. 9 is a diagram explaining the overall structure of a device that is used for providing a program product.

In case the above-mentioned program relating to control is applied to a personal computer or the like, it may be provided by a recording medium such as a CD-ROM or data signal such through the internet or the like. FIG. 9 is a diagram illustrating this situation. A personal computer 950 receives a program via a CD-ROM 953. Also, the personal computer 950 has a connection function to be connected with a communication line 951. A computer 952 is a server-computer that stores above described program into a recording medium such as a hard disk. A communication line 951 is a communication line such as the internet, a personal computer communication, or the like, or a dedicated communication line. A computer 952 reads out the program from the hard disk and transmits the read out program to the personal computer 950 through the communication line 951. That is, it carries the program as data signal with a carrier wave to transmit it through the communication line 951. In this manner, the program can be provided as a computer-readable computer program product in one of various forms such as a recording medium having it stored therein or a carrier wave.

So far as one or more of the features of the present invention are not damaged, the present invention is not limited to the above-mentioned embodiments and/or variation examples and other forms conceivable within the technical idea of the present invention are included within the scope of the present invention.

REFERENCE SIGNS LIST

2 . . . X-ray source, 4 . . . detection device, 5 . . . control unit, 53 . . . image generation unit, 100 . . . X-ray device, 600 . . . structure manufacturing system, 610 . . . design device, 620 . . . molding device, 630 . . . control system, 632 . . . inspection unit, 640 . . . repairing device

The invention claimed is:

1. An image reconstruction method for an X-ray measuring device, comprising:
generating differential data indicating a difference between detection data generated by detecting X-rays that passed through a measurement object by irradiating X-rays to the measurement object and estimate data generated by estimating X-rays that are assumed to have been passed through an estimated structure having been generated by estimating a shape of the measurement object; and
generating an image using the differential data and the estimated structure.

2. The image reconstruction method for an X-ray measuring device according to claim 1, wherein
generating multiple sets of the detection data by detecting the X-ray that passed through the measurement object by irradiating the X-rays to the measurement object in each of multiple different irradiation directions;
generating multiple sets of estimated data by estimating the X-rays that are assumed to have been passed through the estimated structure in each of the multiple different irradiation directions of the X-rays;
an image is generated by performing a back projection image that has been generated by performing back projection of the multiple sets of extracted differential data, those have been generated in each of the multiple different irradiation directions of the X-rays, with the estimated structure.

3. The image reconstruction method for an X-ray measuring device according to claim 2, wherein
an image of an inside structure of the measurement object is generated by combining the back projection image that has been generated by performing the back projection of the multiple sets of the differential data with the estimated structure.

4. The image reconstruction method for an X-ray measuring device according to claim 1, wherein
based on material information of the measurement object and spectrum information of the X-rays that enter the measurement object, an intensity of the X-ray, if the X-rays are assumed to irradiate the estimated structure, is estimated to generate the estimated data.

5. The image reconstruction method for an X-ray measuring device according to claim 4, wherein
assuming that an attenuation coefficient of the X-ray includes a first component that depends on the photon energy of the X-ray and a second component that does not depend on the photon energy of the X-ray, and
calculating a value of the second component using the detection data and the estimated data to extract the differential data.

6. The image reconstruction method for an X-ray measuring device according to claim 1, wherein
based on spectrum information of the X-rays that enter the measurement object and at least one of information relating to photoelectric absorption of the X-ray when the X-ray pass through the measurement object and information relating to Compton effect of the X-ray when the X-ray pass through the measurement object, an intensity of the X-ray, if the X-ray bundle is assumed to irradiate the estimated structure, is estimated.

7. The image reconstruction method for an X-ray measuring device according to claim 1, wherein:
an estimation of the estimated structure is performed using shape information relating to the measurement object; and
the shape information is design information of the measurement object.

8. The image reconstruction method for an X-ray measuring device according to claim 1, wherein
an estimation of the estimated structure is performed using shape information relating to the measurement object; and
the shape information is generated using a back projection image obtained by performing back projection of multiple sets of the detection data.

9. The image reconstruction method for an X-ray measuring device according to claim 1, wherein
when the difference indicated by the differential data does not exceed a first threshold value, generating a back projection image of the differential data by performing back projection of the of differential data, and combining the back projection image of the differential data with the estimated structure to generate an image of an inside structure of the measurement object.

10. The image reconstruction method for an X-ray measuring device according to claim 1, wherein
when the difference indicated by the extracted differential data is larger than a first threshold value, correcting the estimated data based on a difference indicated by the differential data to generate corrected estimated data.

11. The image reconstruction method for an X-ray measuring device according to claim 10, wherein
extracting new differential data indicating a difference between the detection data and the corrected estimated data using the detection data and the corrected estimated data, and
when a difference indicated by the new differential data does not exceed the first threshold value, performing back projection of the new differential data to generate a back projection image of the new differential data, and combining the back projection image of the new differential data is combined with the estimated structure to generate an image of an inside structure of the measurement object.

12. A structure manufacturing method, comprising:
generating design information relating to the shape of a structure;
forming the structure based on the design information;
measuring a shape of the structure that has been formed by performing the image reconstruction method for an X-ray measuring device according to claim 1 to acquire shape information; and
comparing the shape information with the design information.

13. The structure manufacturing method according to claim 12, wherein
reprocessing of the structure is performed based on the comparing result between the shape information and the design information.

14. The structure manufacturing method according to claim 13, wherein
the reprocessing of the structure is achieved by forming the structure again based on the design information.

15. An image reconstruction method for an X-ray measuring device, comprising:
generating differential data indicating a difference between detection data generated by detecting X-ray that passed through a measurement object by irradiating X-rays to the measurement object and estimated data generated by estimating X-rays that are assumed to have been passed through an estimated structure having been generated by estimating a shape of the measurement object; and
determining, when the difference indicated by the differential data does not exceed a predetermined value, that the measurement object is a conforming product.

16. The image reconstruction method for an X-ray measuring device according to claim 15, wherein
when the measurement object is determined to be a conforming product, the differential data is subjected to back projection to generate a back projection image, and the back projection image that has been generated by performing the back projection is combined with the estimated structure to generate an image of an inside structure of the measurement object.

17. A non-transitory computer-readable medium for an X-ray measuring device, having computer-executable instructions, when executed by a processor, the computer-executable instructions cause the processor to:
generate differential data indicating a difference between detection data generated by detecting X-ray that passed through a measurement object by irradiating X-rays to the measurement object and estimated data generated by estimating X-rays that are assumed to have been passed through an estimated structure having been generated by estimating a shape of the measurement object; and
generate an image using the differential data and the estimated structure.

18. The non-transitory computer-readable medium according to claim 17, wherein the computer-executable instructions further cause the processor to generate a back projection image by performing back projection of the differential data and combining the back projection image that has been generated by performing the back projection with the estimated structure to generate an image of an inside structure of the measurement object.

19. The non-transitory image reconstruction program for an X-ray measuring device according to claim 17, wherein
the program further causes the device to perform the method including generating a back projection image by performing back projection of the differential data and combining the back projection image that has been generated by performing the back projection with the estimated structure to generate an image of an inside structure of the measurement object.

20. The X-ray measuring device according to claim 19, wherein
the image generation unit performs back projection of the differential data to generate an image and combines the image that has been generated by performing the back projection with the estimated structure to generate an image of an inside structure of the measurement object.

21. An X-ray measuring device comprising:
a generation unit that generates differential data indicating a difference between detection data generated by detecting X-ray that passed through a measurement object by irradiating X-rays to the measurement object and estimated data generated by estimating X-rays that are assumed to have been passed through an estimated structure having been generated by estimating a shape of the measurement object, wherein
the generation unit generates an image using the differential data and the estimated structure.

* * * * *